(12) United States Patent
Yamazaki

(10) Patent No.: US 7,417,652 B2
(45) Date of Patent: Aug. 26, 2008

(54) IMAGE FORMING APPARATUS

(75) Inventor: Katsuyuki Yamazaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 11/565,734

(22) Filed: Dec. 1, 2006

(65) Prior Publication Data

US 2007/0126851 A1  Jun. 7, 2007

(30) Foreign Application Priority Data

Dec. 1, 2005 (JP) ............... 2005-347970
Oct. 23, 2006 (JP) ............... 2006-287446

(51) Int. Cl.
*B41J 2/385* (2006.01)
*B41J 2/435* (2006.01)

(52) U.S. Cl. ............... 347/116; 347/234; 347/248

(58) Field of Classification Search ............... 347/116, 347/229, 234–235, 248–250; 358/1.9; 399/28, 399/49, 301; 250/208.1
See application file for complete search history.

(56) References Cited

U.S. PATENT DOCUMENTS 4,912,491 A * 3/1990 Hoshino et al. ............... 347/116
5,173,733 A 12/1992 Green
5,523,823 A * 6/1996 Ashikaga ............... 399/28
6,408,156 B1 6/2002 Miyazaki et al.
6,452,147 B1 * 9/2002 Inada ............... 250/208.1
6,456,310 B1 * 9/2002 Wallace et al. ............... 347/116
6,570,671 B1 5/2003 Yamaguchi et al.
6,920,303 B2 * 7/2005 Yamanaka et al. ............... 399/301
7,130,551 B2 * 10/2006 Kobayashi ............... 399/49
2002/0136570 A1 9/2002 Yamanaka et al.
2003/0210412 A1 11/2003 Ishibashi
2004/0109708 A1 6/2004 Kobayashi et al.
2005/0200689 A1 9/2005 Shinohara et al.
2006/0001891 A1 * 1/2006 Yoshida ............... 358/1.9

FOREIGN PATENT DOCUMENTS

JP   2002-014507 A   1/2002
JP   2005-292760 A   10/2005

* cited by examiner

*Primary Examiner*—Hai C Pham
(74) *Attorney, Agent, or Firm*—Canon U.S.A. Inc., I.P. Division

(57) ABSTRACT

A color registration-pattern formed between continuous printing pages with different magnifications is read so as to correct color misalignment by converting the magnification into the reference magnification so as to calculate the present color misalignment correction.
Thereby, a plurality of the color registration-patterns with different magnifications, which are formed between continuous printing pages with differentiated magnifications by the speed change of a polygon-mirror motor can be read so as to correct the color misalignment.

3 Claims, 24 Drawing Sheets

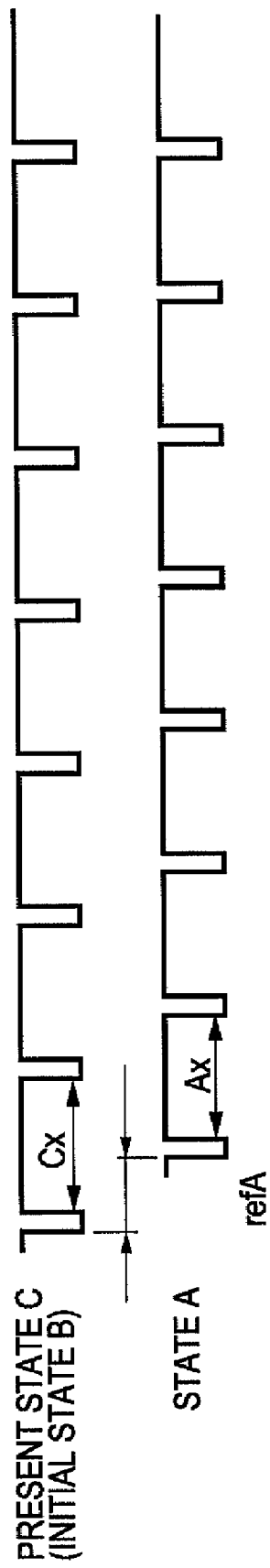

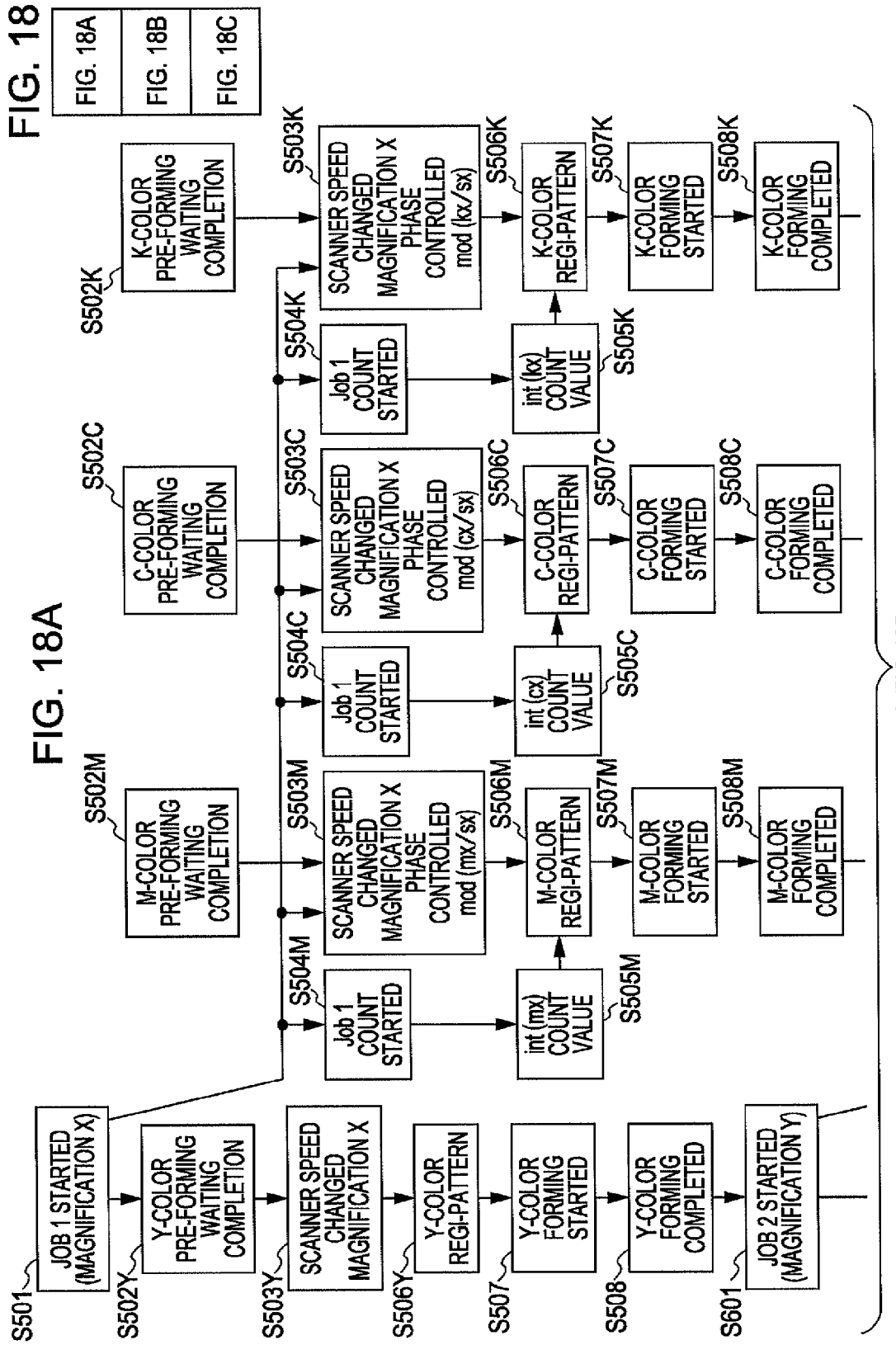

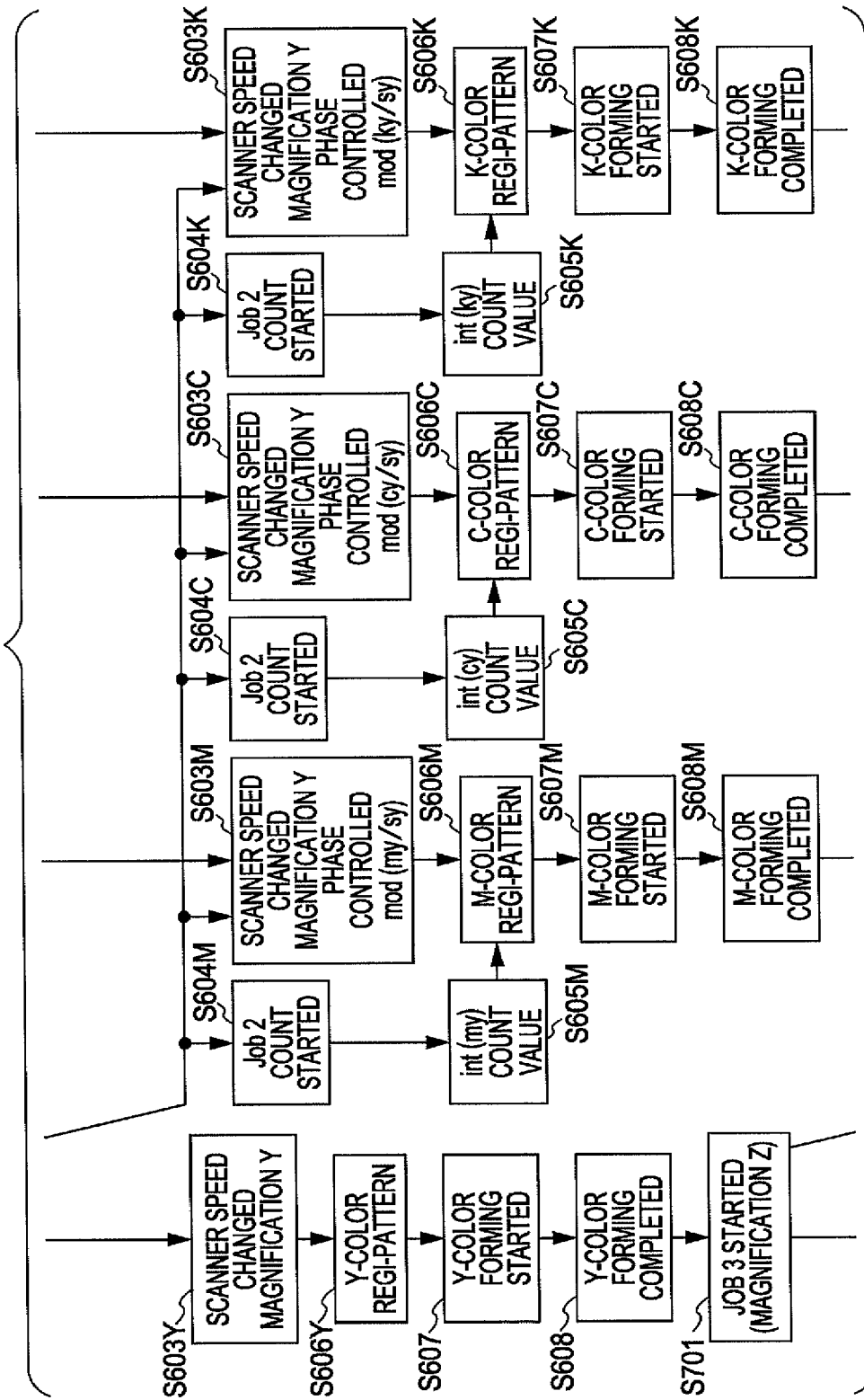

FIG. 19

| SHEET KIND |
|---|
| J SHEET |
| COATED SHEET |
| P SHEET |
| WR SHEET |
| . |
| . |
| . |

| FIXING TEMPERATURE / SHEET THICKNESS | ... | ... | 100°C | 150°C | ... |
|---|---|---|---|---|---|
| ... | ... | ... | ... | ... | ... |
| 0.08 mm | | | 99.9%<br>100% | 99.8%<br>99.9% | |
| 0.09 mm | | | 99.8%<br>99.9% | 99.7%<br>99.8% | |
| 0.10 mm | | | 99.7%<br>99.8% | 99.6%<br>99.7% | |
| 0.11 mm | | | 99.6%<br>99.7% | 99.5%<br>99.6% | |
| 0.12 mm | | | 99.5%<br>99.6% | 99.4%<br>99.5% | |
| ... | | | ... | ... | |

IMAGE FORMING APPARATUS

BACKGROUND OF THE INVENTION

1. Field of the Invention

The present invention relates to a technique for correcting image registration in an image forming apparatus employing an electrostatic recording system or an electro-photographic recording system.

2. Description of the Related Art

Recently users have demanded high speeds and high image quality as well as conformity with various kinds of recording sheets (recording media) for image forming apparatuses. This provides particular challenges for color image forming apparatus, where multi-color images are sequentially overlapped on a transfer member so as to form color images.

As a means for increasing speed, a tandem type of recording system is provided in which a plurality of image forming sections for each color are arranged in a row. The speed of the system can be further increased by reducing the gap between pages or recording sheets, i.e., between images continuously formed during continuous printing.

In order to improve image quality, in both the monochromatic and color image forming apparatuses, the displacement relative to a recording sheet is reduced by improving accuracies in position for forming images on the recording sheet. In a color image forming apparatus, high image quality is also achieved by improving accuracies in position when multi-color images are overlapped on one transfer sheet so as to reduce color misalignment. Furthermore, in the color image forming apparatus, high image quality is achieved by reducing density misalignment between desirable images and images formed by the image forming apparatus in practice. For correcting the position misalignment, the color misalignment, and the density misalignment, the image forming job can be stopped (interrupted) so as to form a mark train on a transfer member for detecting the misalignment based on the detected result. After adjustment, the image forming job can be resumed.

However, since the job has been interrupted for correction (adjustment) in this method, the productivity is reduced. In addition, a problem arises in that image quality is different before and after the adjustment is made during the same job.

It has been suggested in Japanese Patent Laid-Open No. 2005-292760 that adjusting color misalignment without interruption can be achieved by performing the correction in the gaps (intervals) between images continuously formed during continuous printing.

When images are formed on both sides (front and rear sides) of one recording sheet, the adjustment of size and position of the images on both sides (double-side registration) is demanded. When toner images formed on the recording sheet are fixed by heating, since part of the moisture contained in the recording sheet is evaporated due to the fixing heat, the recording sheet can contract after the fixing so as to generate dimensional change. This dimensional change is different for each type of recording sheet.

In a two-sided printing mode, after images are fixed on the front side (first side), images are formed on the rear side (second side) in a state that the recording sheet has contracted by about 0.1 to 0.5%. Hence, when the recording sheet by absorbs water after the images are formed on the rear side, the recording sheet and images expand, so that the image size of the front side is different from that of the rear side, resulting in poor front to back image registration. An image forming apparatus is proposed in Japanese Patent Laid-Open No. 2002-014507 for improving image quality by solving the problems during the two-sided printing described above, by changing the rotational speed of a polarizer (rotary polygon mirror), which is scanning means for writing images, to align the double-side image dimensions during two-sided printing.

As described above, for speeding up and improving image quality, it is effective to align images in the space between continuously formed images. Also, in improving image quality during two-sided printing, a technique changing the rotational speed of the polarizer (rotary polygon mirror) is effective for the image dimensional alignment.

Accordingly, for speeding up and improving image quality, it may be effective to change the rotating speed of the polarizer (rotary polygon mirror) in conformity with the dimension of the continuously formed images (i.e., changing the image dimension) as well as to align the image in the space between continuously formed images.

A sequence of reference marks for detecting the misalignment needs to be formed at a known reference image size as disclosed in Japanese Patent Laid-Open No. 2005-292760. However, the size of the reference marks for detecting the misalignment for double sided images must be changed between the imaging of the first side and the second side. Therefore, the rotational speed of the polarizer must be changed so that the image dimension becomes 100%. That is, the rotational speed of the polarizer is changed for writing so that the image dimension at a first time (front side) becomes 102%; after writing, the rotational speed of the polarizer is changed so that the image dimension becomes 100% so as to form the reference marks on the other side for detecting the misalignment. Furthermore, the rotational speed of the polarizer is changed for writing so that the image dimension at a second time (rear side) becomes 98%; after writing, the rotational speed of the polarizer is changed so that the image dimension becomes 100% so as to form the reference marks for detecting the misalignment. These operations are to be repeated.

During changing the rotational speed of the polarizer, images cannot be formed. Also, the rotational speed of the polarizer is not stabilized until a predetermined time lapses after changing it, so that with increasing number of times of changing the rotational speed, the space between continuously formed images is increased, reducing the productivity of printing.

Accordingly, the number of times of changing the rotational speed of the polarizer is desirable to be as small as possible. That is, it is desirable that the reference marks for detecting the misalignment be formed without changing the rotational speed of the polarizer.

The present invention addresses these problems and others which will be understood from the following description.

SUMMARY OF THE INVENTION

The present invention provides an image forming apparatus capable of forming high quality images at a high speed while suppressing misalignment to the minimum without interrupting continuous printing.

The above-mentioned features are achieved by the combination of the features described in aspects of the present invention define further advantageous embodiments of the present invention.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a drawing showing a periodic signal of the polygon motor according to the embodiment.

FIGS. 18, 18A, 18B and 18C are a flowchart of the correction-value acquisition computation according to the embodiment.

FIG. 19 is a table of the variable power ratio, established in conformity with the sheet thickness and the fixing temperature, according to the embodiment.

DESCRIPTION OF THE EMBODIMENTS

Preferred embodiments of the present invention will now be described in detail with reference to the attached drawings.

The embodiments below do not limit the invention according to Claims, and the entire combinations of the features described in the embodiments are not necessarily mandatory for the invention.

First Embodiment (1) Configuration of Image forming apparatus

Figure 1:
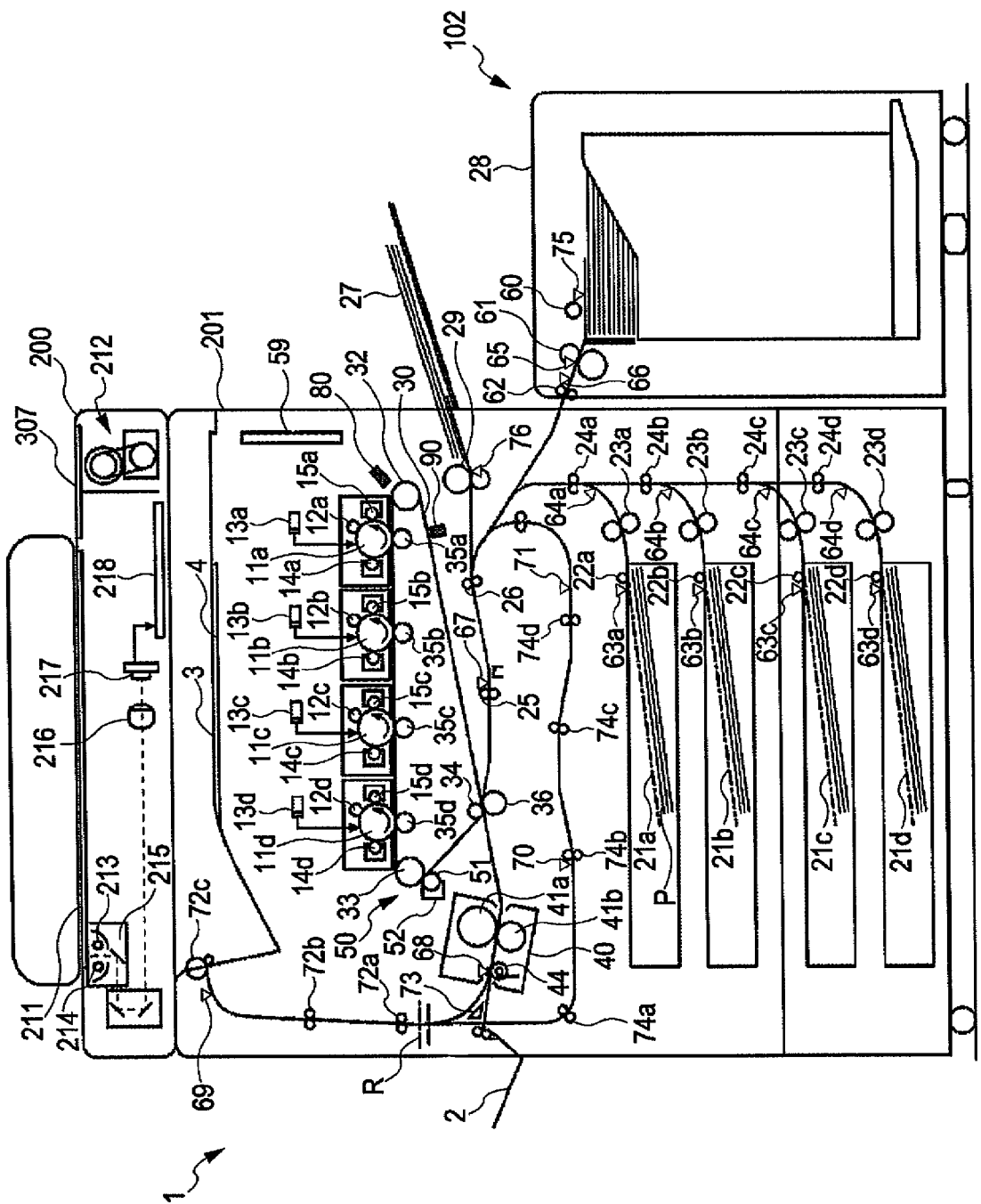
FIG. 1 is a longitudinal sectional view of the schematic configuration of an image forming apparatus according to an embodiment of the present invention.

FIG. 1 is a schematic sectional view of an image forming apparatus according to an embodiment. The image forming apparatus includes a color image forming section 101 and a sheet feeding deck 102.

The color image forming section 101 includes a digital color reader 200 (will be referred to as a reader below) and a digital color image printer unit 201 (will be referred to as a printer unit below) arranged below the reader 200.

In the reader 200, a manuscript is placed on a manuscript stand glass 211, and a manuscript scanning unit 215 including exposure lamps 213 and 214 scans the manuscript by exposure at a predetermined speed by an optical-system reading drive motor 212. Then, reflected light images from the manuscript are condensed on a full-color sensor (CCD) 217 with a lens 216 so as to have a color-separation image signal. The full-color sensor 217 uses a three-line CCD having filters R (red), G (green), and B (blue) arranged adjacent to each other. The color-separation image signal is processed in an image processor 218 and then, it is fed to the printer unit 201.

In the vicinity of the manuscript stand glass 211, an operation section 307 is provided, on which switches for setting various modes about copying sequences, display, and indicators are arranged.

In the printer unit 201, a control unit 59 is composed of a controller board having a CPU, a RAM, and a ROM. The image forming apparatus totally controls the operations of a sheet feed unit, an intermediate transfer unit, a conveying unit, a fixing unit and the operation panel on the basis of control programs stored in the ROM.

The image forming section is configured as follows. Photosensitive drums 11a, 11b, 11c, and 11d journaled on their axes are rotated as photosensitive image carriers in an arrow direction by a drive motor (not shown). Roller chargers 12a to 12d, optical units 13a to 13d including beam generators and scanning units, developing units 14a to 14d, cleaning units 15a to 15d are arranged to oppose the external peripheral surfaces of the photosensitive drums 11a to 11 d in the rotational direction of the photosensitive drums 11a to 11 d. The surfaces of the photosensitive drums 11a to 11 d are uniformly charged by the roller chargers 12a to 12d, respectively.

Then, by exposing the surfaces of the photosensitive drums 11a to 11d with a laser beam modulated according to an image signal from the optical units 13a to 13d, electrostatic latent images are formed on the photosensitive drums. Furthermore, the electrostatic latent images are visualized by the developing units 14a to 14d respectively containing four-color developers black, cyan, magenta, and yellow (referred to as toner below). The visualized images are transferred onto an intermediate transfer belt 30. Then, the residual toner remaining on the photosensitive drums 11a to 11d is recovered by the cleaning units 15a to 15d. By this process, images are sequentially formed with each kind of toner.

Next, the sheet feed unit includes a unit for accommodating a recording sheet P, rollers for conveying the recording sheet P, a sensor for detecting the presence of the recording sheet P, and a guide (not shown) for transferring the recording sheet P along a transfer path.

The recording sheets P are accommodated in cassettes 21a to 21d, a manual feed tray 27, and a deck 28. Pickup rollers 22a to 22d feed the recording sheet P one by one from the top.

A plurality of the recording sheets P may be fed by the pickup rollers 22a to 22d; however, they are securely separated to single sheets by BC rollers 23a to 23d. The recording sheet P separated to one sheet by the BC rollers 23a to 23d is further conveyed by drawing rollers 24a to 24d and pre-resist rollers 26 to resist rollers 25.

One sheet is separated from the recording sheets P accommodated in the manual feed tray 27 by a BC roller 29 and is conveyed to the resist rollers 25 by the pre-resist rollers 26. A plurality of the recording sheets P accommodated in the deck 28 are conveyed to feed rollers 61 by a pickup roller 60, and are securely separated one after another by the feed rollers 61 and conveyed to drawing rollers 62. Furthermore, the recording sheet P is conveyed to the resist rollers 25 by the pre-resist rollers 26.

Now, the intermediate transfer unit will be described in detail. An intermediate transfer belt 30 as an image carrier is made of a conductive resilient layer made of an elastic material, such as urethane rubber, silicone rubber, and CR (chloroprene rubber), formed on a base layer and having a surface layer formed thereon and made of a fluororesin or FKM (fluoroelastomer). A drive roller 32 transmits a driving force to the intermediate transfer belt 30, which is supported by a tension roller 33 for applying an appropriate tension to the intermediate transfer belt 30 by the urging force of a spring (not shown) and a follower roller 34 for forming a secondary transfer region by pinching the belt.

The drive roller 32 is rotated by a stepping motor (not shown). Primary transfer rollers 35a to 35d are arranged at positions on the back of the intermediate transfer belt 30 so as to respectively oppose the photosensitive drums 11a to 11d with the intermediate transfer belt 30 therebetween for charging a high voltage transferring the toner image on the intermediate transfer belt 30. A secondary transfer roller 36 is arranged to oppose the follower roller 34 for forming the secondary transfer region with the nip formed by the intermediate transfer belt 30. The secondary transfer roller 36 is pressed on the intermediate transfer belt 30 with an appropriate pressure.

Downstream the secondary transfer region on the intermediate transfer belt 30, a cleaning unit 50 is arranged for cleaning the image forming surface of the intermediate transfer belt 30. The cleaning unit 50 includes a conductive fur brush 51, a bias roller (not shown) for applying a bias to the conductive fur brush 51, and a spent toner box 52 for accommodating spent toner.

A fixing unit 40 includes a fixing roller 41a having a heat source, such as a halogen heater, accommodated therein; a fixing roller 41b (in which a heat source may also be accommodated) to be pressurized towards the fixing roller 41a; and an inner discharge roller 44 for conveying the recording sheet P discharged from the fixing roller pair.

Along the transfer path of the recording sheet P, a plurality of sensors are arranged for detecting the passage of the recording sheet. For example, there are provided feed retrial sensors 64a to 64d, a deck feed sensor 65, a deck drawing sensor 66, a resist sensor 67, an inner discharge sensor 68, a face-down discharge sensor 69, a double-sided pre-register sensor 70, and a double-sided re-feed sensor 71.

In the cassettes 21a to 21d, cassette sheet presence sensors 63a to 63d are arranged for detecting the presence of the recording sheet P. In the manual feed tray 27, a manual feed tray sheet presence sensor 76 is arranged for detecting the presence of the recording sheet P on the manual feed tray 27. In the deck 28, a deck sheet presence sensor 75 is also arranged for detecting the presence of the recording sheet P in the deck 28.

(2) Operation of Image Forming Apparatus

A case where the recording sheet P is conveyed from the cassette 21a will be described, for example. After a lapse of time from the job starting, upon generating an image forming start signal, in the image forming section, toner images formed on the photosensitive drum 11d, which is located mostly upstream in the rotational direction of the intermediate transfer belt 30, are primarily transferred on the primary transfer region of the intermediate transfer belt 30 by the primary transfer roller 35d with an applied high voltage. The primarily transferred toner images are conveyed to the next primary transfer region.

In each image forming section, the image forming is delayed for the toner-images conveying time between the image forming sections, so that the next images are transferred by aligning the leading edge of the images with that of the previous images. Thereafter, the same process is repeated and four-color toner images are primarily transferred on the intermediate transfer belt 30.

On the other hand, the recording sheet P is fed one after another from the cassette 21a by the pickup roller 22a. Then, the recording sheet P is conveyed to the resist rollers 25 via the drawing rollers 24a and the pre-resist rollers 26 by the BC rollers 23a. At this time, the resist rollers 25 are stopped, so that the leading edge of the recording sheet P abuts the nip.

Figure 7:
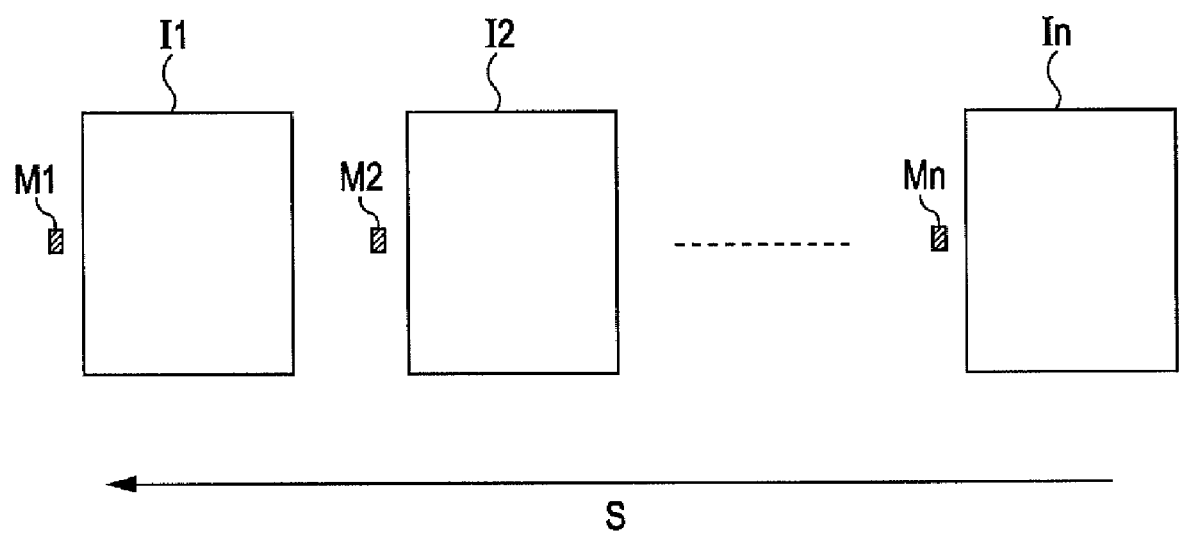
FIG. 7 is a drawing showing the arrangement of a page-space processing according to the embodiment.

FIG. 7 is a drawing of a state that the toner images transferred on the intermediate transfer belt 30 move toward the secondary transfer roller 36. Arrow S denotes the conveying direction. Reference numeral I1 denotes the images on the first sheet; numeral M1 denotes the edge mark formed in the magenta image forming section; and similarly, numerals M2 to Mn denote edge marks of the images I2 to In, respectively. The edge marks M1 to Mn are detected by an edge-mark detecting sensor 90, and the resist rollers 25 start rotating at the time when the recording sheet P is just aligned with the images I1 to In.

Then, when the recording sheet P enters the secondary transfer region to be brought into contact with the intermediate transfer belt 30, a high voltage is applied to the secondary transfer roller 36 simultaneously with the passage of the recording sheet P. Then, by the process described above, the four-color toner images formed on the intermediate transfer belt 30 are transferred on the surface of the recording sheet P. Then, the recording sheet P is guided to the fixing roller nip. By the heat and the nip pressure of the fixing roller pair 41a and 41b, the toner images are fixed on the recording sheet P. Thereafter, the recording sheet P is discharged to a face-up discharge tray 2 or a face-down tray 3 in accordance with the switching direction of the switching flapper.

In two-sided printing, the recording sheet P having the fixed images formed on its first surface is conveyed toward inverting rollers 72a to 72c by switching the destination with a switching flapper 73 after the recording sheet P passes through the inner discharge roller 44. Then, when the trailing edge of the recording sheet P arrives at an inversion position R, the inverting rollers 72a to 72c are reversely rotated so as to convey the recording sheet P toward double-sided transfer rollers 74a to 74d to form images on the other side of the sheet by conveying it to the pre-resist rollers 26.

In the vicinity of the intermediate transfer belt 30, a patch detection sensor 80 is arranged for detecting an image adjusting patch, which is an image pattern formed in a space on the transfer belt between sheets to enable the correction of target images.

Figure 4:
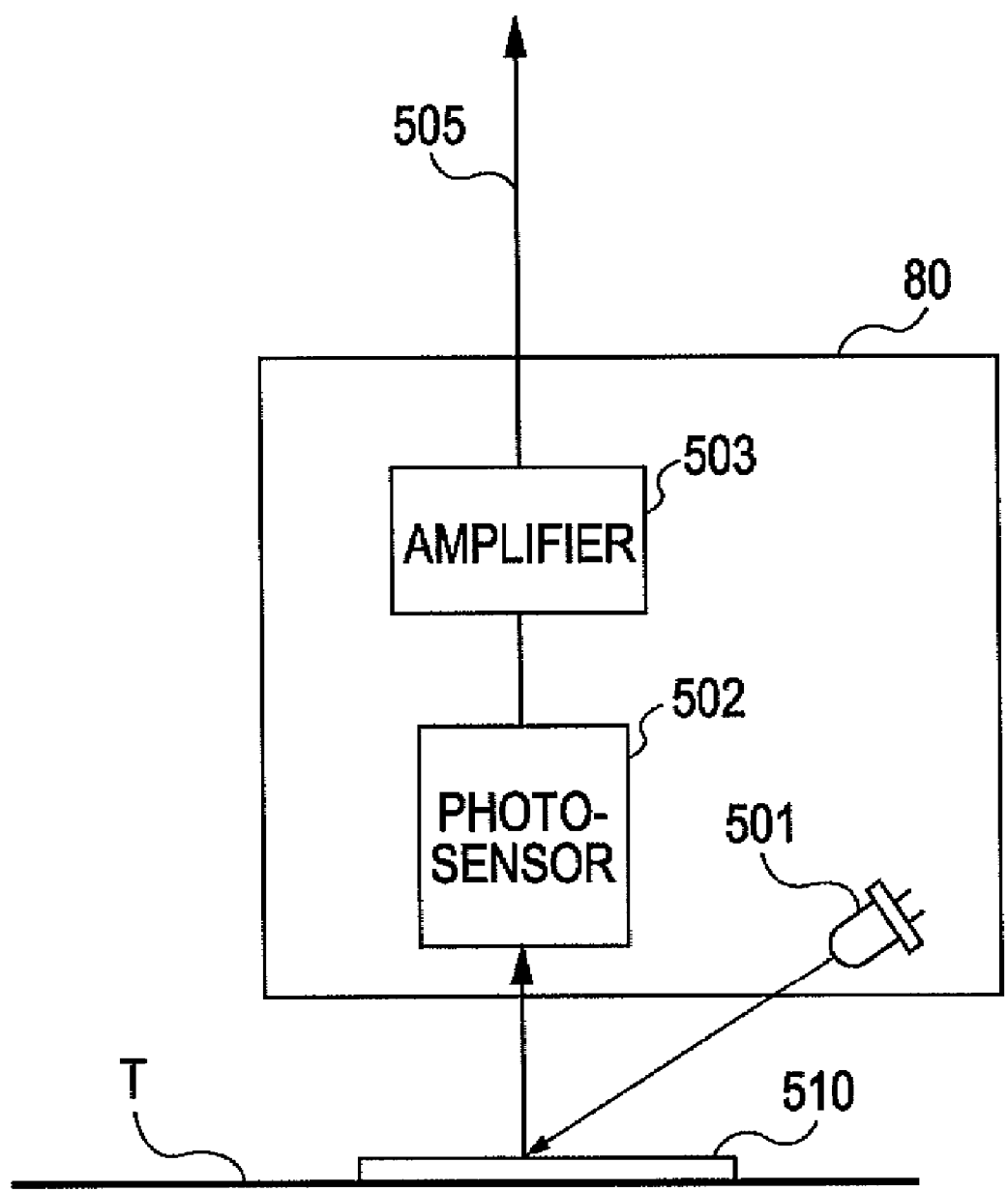
FIG. 4 is a drawing showing the configuration of a patch detection sensor according to the embodiment.

FIG. 4 is an explanatory view illustrating a method for detecting an image adjusting patch formed on the intermediate transfer belt 30. FIG. 4 shows the configuration of the patch detection sensor 80 and the relationship between the patch and the patch detection sensor when detecting the image adjusting patch. Reference numeral 501 denotes a light source; numeral 502 a photo-sensor; and an image adjusting patch 510 is formed on an intermediate transfer belt T. The photo-sensor 502 detects a regular reflection component of the light from the light source 501, which is reflected by the surface of the patch. An amplifier 503 amplifies the signal from the photo-sensor 502 so as to output an amplified signal 505.

(3) Configuration of Control Unit

Figure 2:
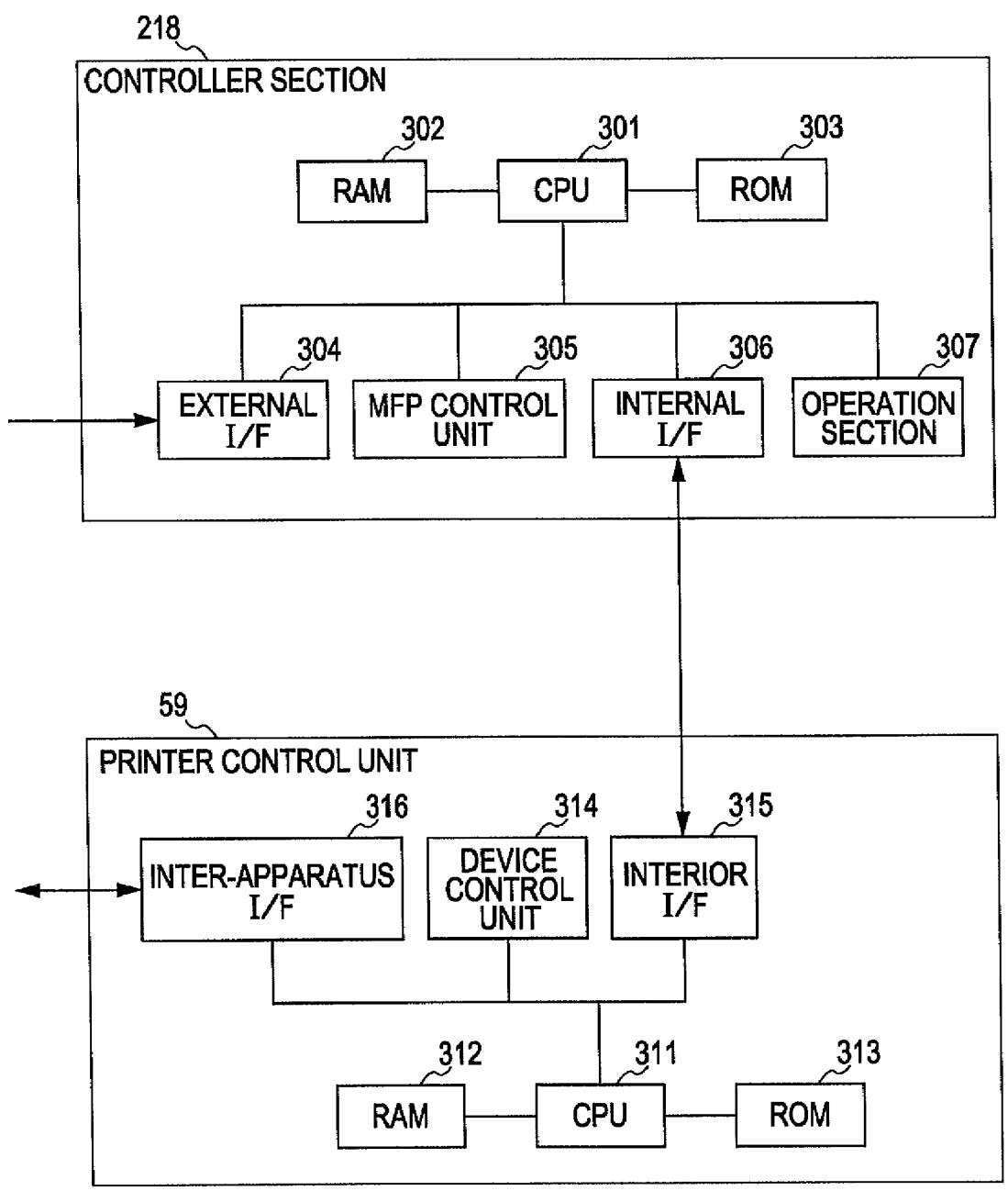
FIG. 2 is a block diagram of the image forming apparatus according to the embodiment.

FIG. 2 is a block diagram to a control unit according to the present embodiment. To a CPU 301 in a controller section 218, a ROM 303 having written control programs and a RAM 302 for storing processing data are connected via an address bus and a data bus. An external I/F 304 for communicating with the outside, an MFP (micro flat package) control unit 305 for converting, accumulating, and image-processing input image data, such as scanned image data of a paper manuscript and PDL (page-description language) data from the external I/F 304, and an internal I/F 306 for communicating with a printer unit 201 are also connected to the CPU 301.

The operation section 307 is also connected to the CPU 301. The CPU 301 controls displaying means and key entering means of the operation section 307. A user instructs the CPU 301 to switch the display through the key entering means, and the CPU 301 controls the displaying means of the operation section 307 to display the operational situation of the apparatus and the operation mode set by the key input.

A CPU 311 in a printer control unit 59 controls the image forming operation. The CPU 311 is connected to a ROM 313 having written control programs and a RAM 312 storing data for processing the image forming operation via an address bus and a data bus. The ROM 313 has control sequences, which will be described later, stored therein. A device control unit 314 is an electrical circuit having input-output port controlling components of the printer unit. An interior I/F 315 exchanges an image signal and a timing signal with the controller section 218. An inter-apparatus I/F 316 exchanges sheet information and timing information with a sheet processing apparatus.

The CPU 311 receives an image signal via the controller section 218 and the interior I/F 315 so as to execute the image forming operation by controlling the device control unit 314 in accordance with the control programs while executing the sheet conveying operation by exchanging the sheet information and the timing information with another apparatus via the inter-apparatus I/F 316.

(4) Configuration of MFP Control Unit

Figure 3:
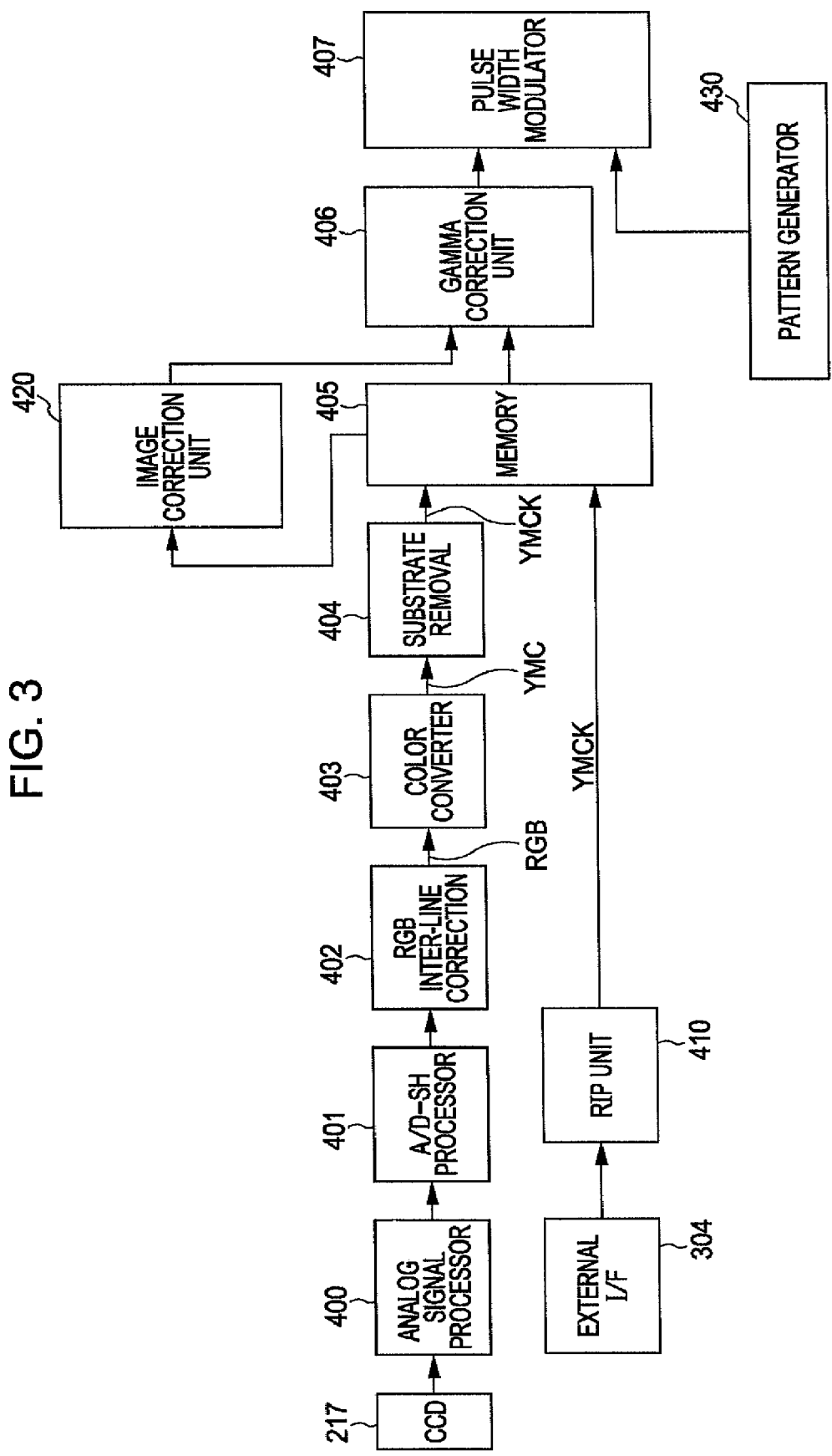
FIG. 3 is a block diagram of the configuration of an MFP control unit according to the embodiment.

FIG. 3 is a block diagram showing the internal configuration of the MFP control unit 305 in the controller section 218. Image data entering the MFP control unit 305 are roughly classified into data outputted from the CCD sensor 217 of a scanner, such as from a copying operation, and data outputted from the external I/F 304, such as network printing operation.

The manuscript image focused on the CCD sensor 217 is converted into an analog electric signal by the CCD sensor 217. The converted image information is inputted into an analog signal processor 400 and then, it is A/D-converted by an A/D-SH processor 401 after the correction of the sample-hold and the dark level. Furthermore, shading correction is performed on the digitized signal. In the shading correction, the correction for variations for each pixel included in the CCD sensor 217 and the correction for light-amount variations due to the flux distribution characteristics of a manuscript illumination lamp are executed.

Then, in an RGB inter-line correction unit 402, RGB inter-line correction is performed. The light beams entering RGB-light receiving sections of the CCD sensor 217 at one time are displaced on a manuscript in conformity with the positional relationship of the RGB light receiving sections, so that the signals are synchronized between RGB signals. Then, in a color converter 403, the RGB signals are converted into YMC signals by direct mapping, respectively. Next, in a substrate removal unit 404, a K signal is produced from the YMC signals. In this case, from densities of the YMC signals, the minimum density is subtracted as a gray component so as to have density signals Dy, Dm, and Dc, respectively. The gray component is gain-adjusted to have a K density signal Dk, and it is stored in a memory 405.

On the other hand, an RIP (raster image processor) unit 410 analyzes PDL (page-description language) data inputted from the external I/F 304 so as to convert them into a normalized L*a*b space. The L*a*b data are again converted into an YMCK space suitable for a targeted printer so as to produce YMCK signals for storing them into a memory 405.

An image correction unit 420 corrects the image data stored in the memory 405 with the densities of an image-density adjusting patch detected by the patch detection sensor 80 so as to input the data into a gamma correction unit 406. When image data need not be corrected, the image data in the memory 405 are inputted into the gamma correction unit 406 directly.

The gamma correction unit 406 changes image density signals Y, M, C, and K so that the initial image density of a printer engine agrees with the output density image processed according to γ characteristics, using respective look-up tables.

The changed image density signals are modulated in pulse width in a pulse width modulator 407 and inputted into a laser driver of the printer control unit.

A pattern generator 430 generates an image adjusting patch pattern to be formed in an inter-page portion.

(5) Configuration of Operation Section

Figure 5A:
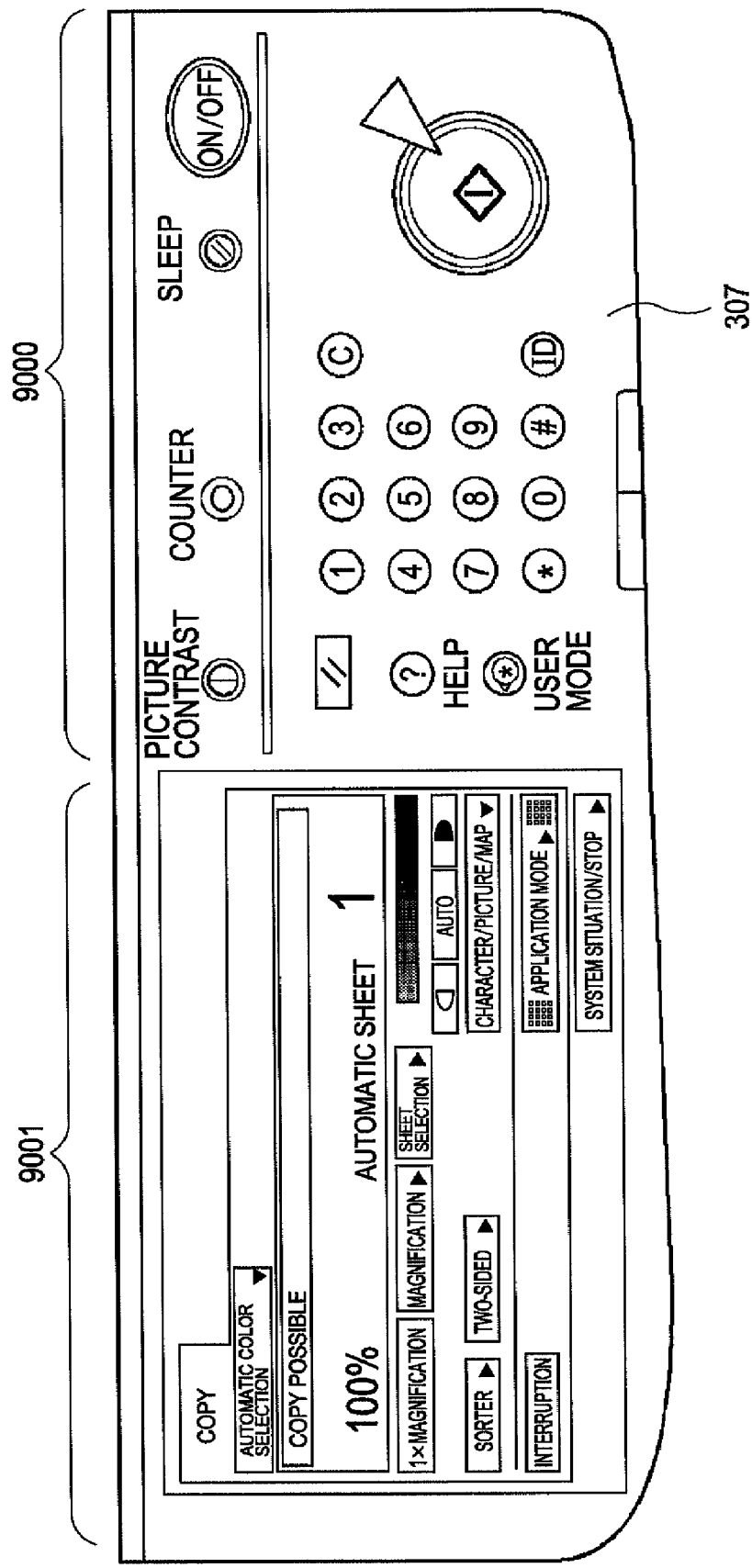
FIG. 5A is a schematic view of an operation panel.
Figure 5B:
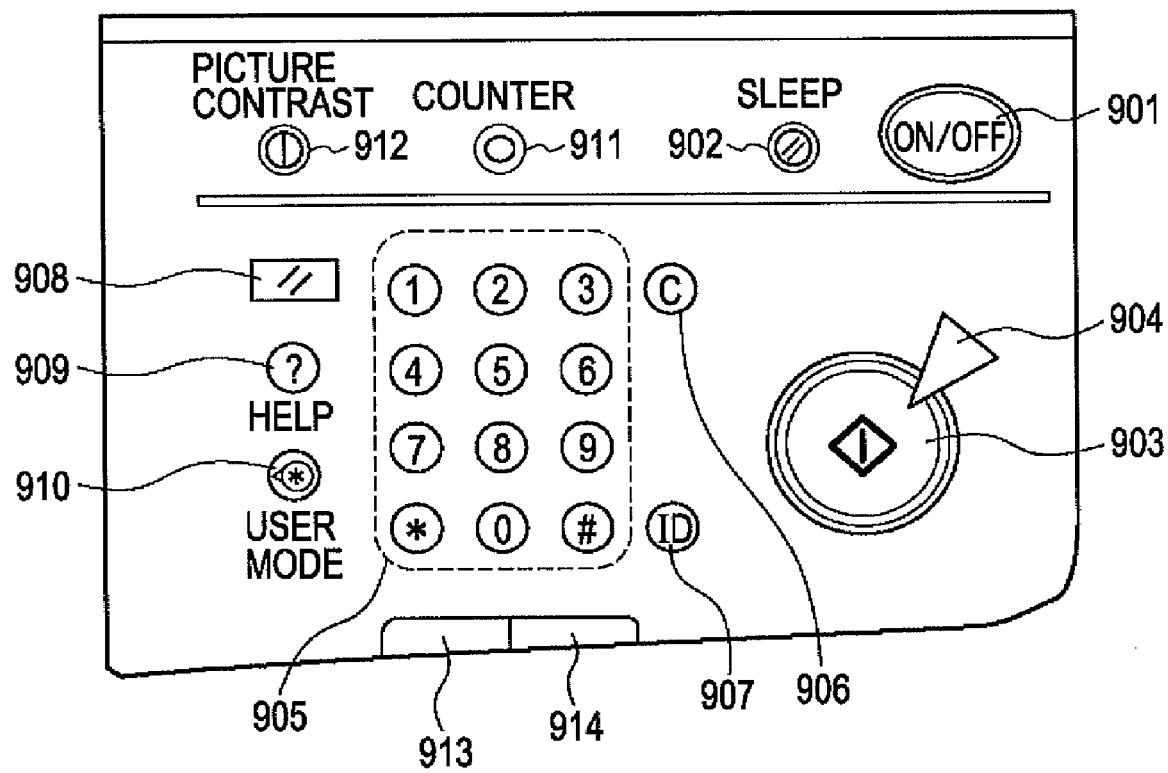
FIG. 5B is a schematic view of a key-entry unit of the operation panel.
Figure 5C:
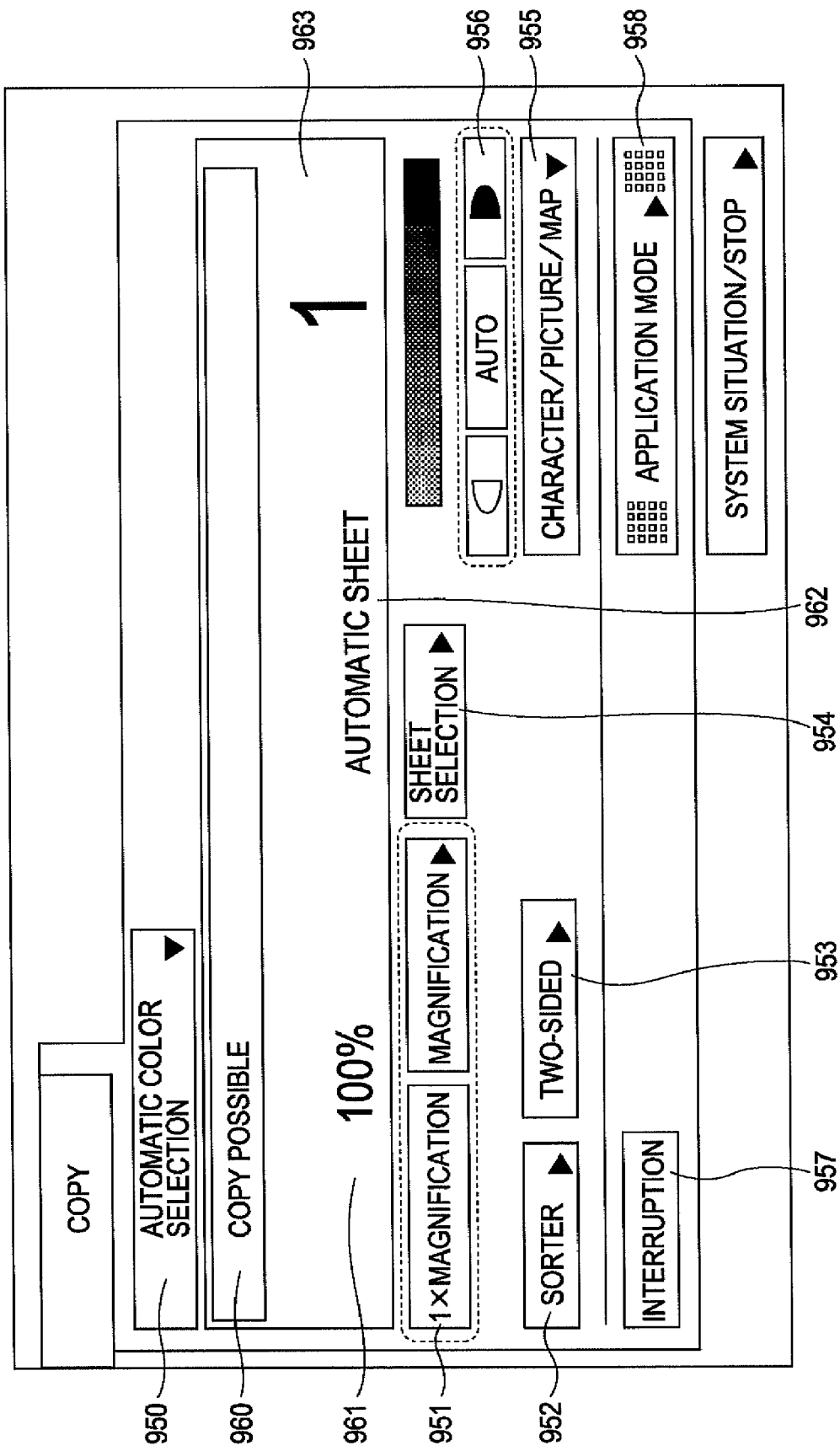
FIG. 5C is a schematic view of a touch panel display.

FIG. 5A is a schematic view of the operation section 307 composed of a key-entry part 9000 and a touch panel part 9001. FIGS. 5B and 5C show details of the respective parts. These details will be described below.

First, FIG. 5B shows the key entry part for setting normal operations. An operation section power switch 901 switches between a standby mode (normal operations) and a sleep mode (power consumption is suppressed) and it can be operated in the ON state of the main power switch for supplying power to the entire image forming apparatus.

A sleep key 902 suppresses power consumption by reducing the control temperature of the fixing unit in the standby mode, although the printing needs a lapse of time. A start key 903 is for instructing the start of copying; a stop key 904 is for instructing stopping the copying.

Ten keys 905 are numeric keys for setting various functions; a clear key 906 is for clearing the entry functions; an ID key 907 is for allowing a user to input a password set in advance for identifying the user of the apparatus; a reset key 908 is for canceling various set functions so as to return to a default value; a help key 909 is for displaying guidance and a help; and a user mode key 910 is for shifting to a user mode picture plane for system setting and various adjustments.

A counter confirmation key 911 is for displaying the number of already-outputted sheets stored in a soft counter for counting the number of printed sheets. It can display the number of already-outputted sheets in conformity with the operation mode of copy/print/scan, the color mode of color/monochrome, and the sheet size of large/small.

A picture contrast dial 912 is for adjusting the picture visibility by controlling the backlight of the liquid crystal display on a touch panel.

An execution/memory lamp 913 is a flashing lamp for informing a user of the job execution and the access to a memory; an error lamp 914 is a flashing lamp for informing a user of an error, such as the job execution failure and the need for service, the need for an operator call such as jamming, and when it is time to replenish consumable supplies.

Next, FIG. 5C is a schematic view of a touch panel display composed of an LCD (liquid crystal display) and a transparent electrode bonded thereon. Upon touching a key equivalent part of the transparent electrode displayed on the LCD, a different operation picture plane is displayed programmed in advance. The drawing is an initial picture plane of the standby mode and various operation picture planes can be displayed by the setting.

A color selection set key 950 is for selecting color copying, monochromatic copying, or the automatic selection in advance; a magnification set key 951 is a key shifting to magnification setting picture planes such as direct, expansion, and contraction; an after treatment set key 952 is a key shifting to picture planes for setting the presence, number, and position of staples or punches; a side set key 953 is a key shifting to an image plane for selecting one-sided printing or two-sided printing; a sheet size set key 954 is a key shifting to an image plane for selecting a sheet cassette, a sheet size, and a media type; an image mode set key 955 is for selecting an image mode suitable for the manuscript image, such as a character mode and a picture mode; and a density set key 956 is for adjusting the density of the output images.

Next, a status display 960 is for simply displaying states such as standby, warming up, jamming, and errors; a magnification display 961 is for displaying the magnification set by the magnification set key; a sheet size display 962 is for displaying the sheet size and the mode set by the sheet size set key; and a number of sheets display 963 is for displaying the number of sheets designated by the ten keys, or displaying which sheet is being printed during operation.

Furthermore, an interruption key 957 is used for allowing a different job to interrupt the present copying; an application mode key 958 is a key shifting to a setting image plane for setting various kinds of image processing and layout such as page continuous copying, book cover/inserting paper setting, reduction layout, and an image displacement.

(6) Description of Change in Image Magnification

Then, the change in image magnification for every page (picture) will be described as a feature of the present invention.

Figure 6A:
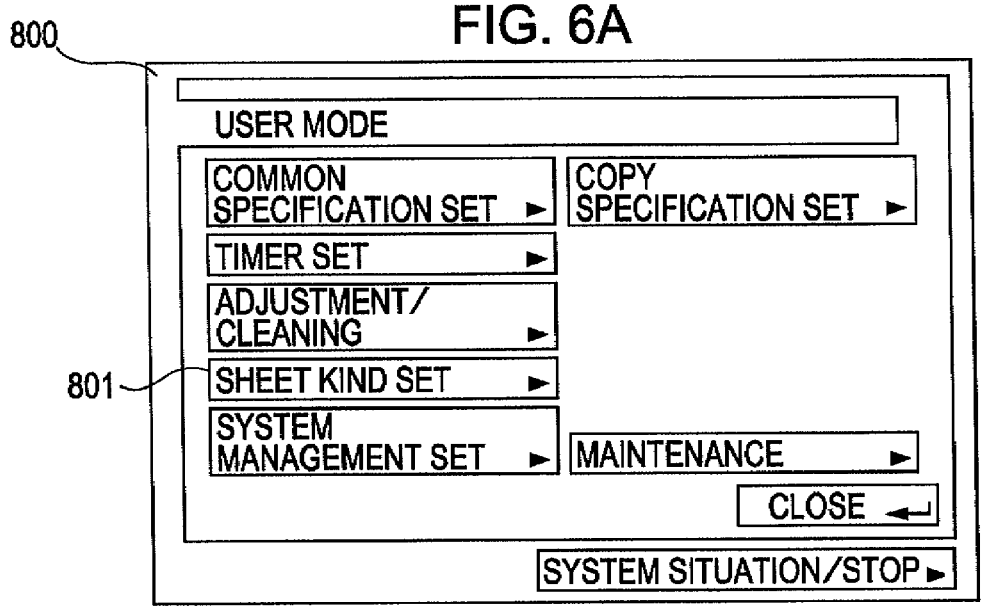
FIG. 6A is a user mode picture plane.

First, the image magnification setting for each sheet will be described in detail. By pushing the user mode key 910 shown in FIG. 5B, a user mode picture plane 800 shown in FIG. 6A is displayed. Keys for setting/adjusting various items are displayed on the user mode picture plane 800, wherein when the sheet kind set key 801 is selected, a sheet kind set picture plane 810 is displayed. On the sheet kind set picture plane 810, a sheet kind key is displayed, which is registered from a picture plane (not shown) displayed by selecting a new registry key 812.

Figure 6B:
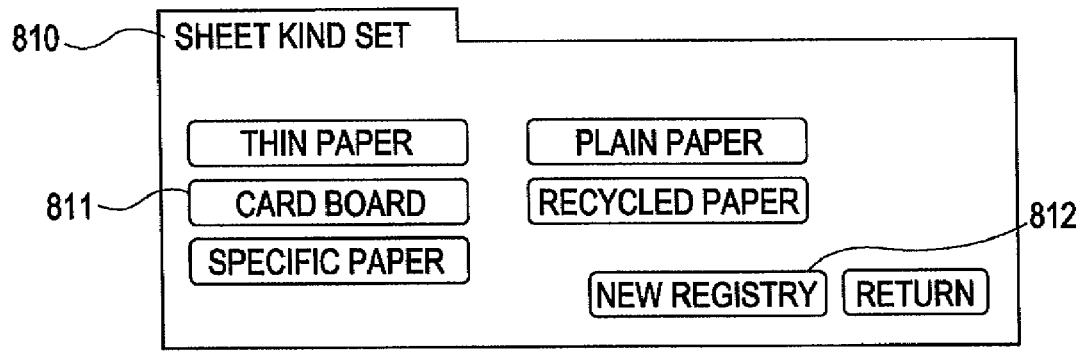
FIG. 6B is a sheet kind setting picture plane.
Figure 6C:
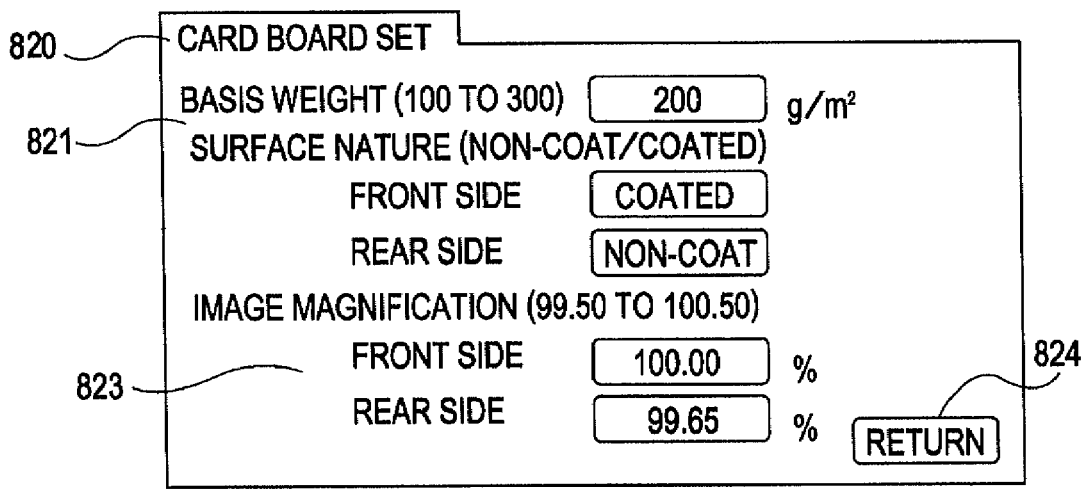
FIG. 6C is a cardboard setting picture plane.

FIG. 6C shows a cardboard set picture plane 820 displayed when a cardboard key 811 is selected. Reference numeral 821 denotes the sheet basis weight setting, in which numeric value within a displayed range is inputted from the ten keys; reference numeral 821 denotes the surface nature setting, wherein by every pushing both "front side" and "rear side", "non-coat" and "coated" are toggle-displayed; and numeral 823 denotes an image magnification setting, wherein numeric value within a displayed range is inputted from the ten keys. According to the embodiment, in both "front side" and "rear side", the setting is possible at intervals of 0.01%; numeral 824 denotes a return key returning to the sheet kind set picture plane 810.

Figure 8A:
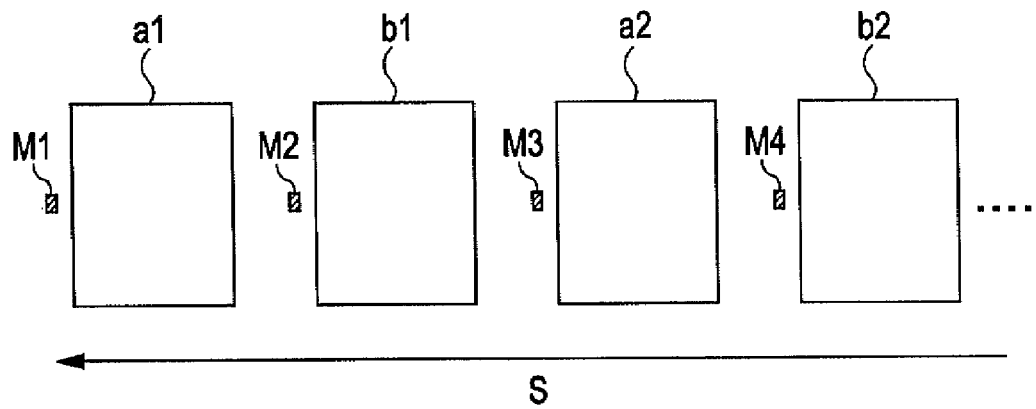
FIG. 8A is an explanatory view of the printing on a front side.

FIG. 8A shows a picture plane when different kinds of sheets are alternately fed so as to print on the front side. That is, the picture plane is shown wherein when a cardboard and a plain sheet are alternately fed from the cassette 21*a* and the cassette 21*b*, respectively. Arrow S denotes the proceeding direction of images; symbols M1 to M4 indicate edge marks formed in the magenta image forming section; symbols a1 and a2 denote images to be transferred on the surface of the cardboard fed from the cassette 21*a*; and symbols b1 and b2 denote images to be transferred on the surface of the plain paper fed from the cassette 21*b*. When the image magnification on the plain paper herein is set at 99.98% and that on the cardboard is set at 100.00%, the rotary polyhedron (scanning unit) is controlled in speed by controlling a motor for driving the rotary polyhedron for changing the image magnification between the respective images. That is, the scanning speed of the scanning unit is controlled.

Figure 8B:
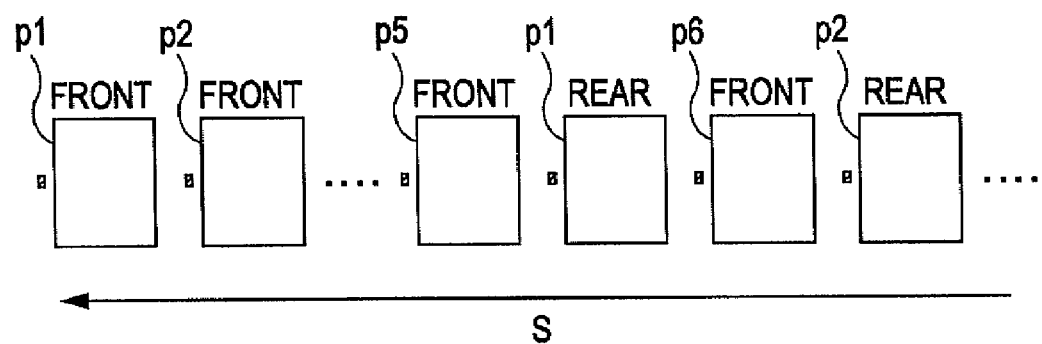
FIG. 8B is an explanatory view of the printing on both sides of the same kind of a sheet.

FIG. 8B also shows an image plane when printing images on both sides of the same kind of sheet. That is, the image plane is shown when both sides of the plain paper fed from the cassette 21*a* are printed. Arrow S denotes the proceeding direction of images. The plain sheets sequentially fed from the cassette 21*a* are p1, p2, ..., p5, and p6, and printed image planes are arranged in the order of p1 front, p2 front, ..., p5 front, p1 rear, p6 front, p2 rear ... When the image magnification on the front side of the plain paper is set at 100.00% and on the rear side at 99.97%, for changing the image magnification between images of p5 front and p1 rear, between p1 rear and p6 front, between p6 front and p2 rear, the rotary polyhedron (scanning unit) is controlled in speed by controlling the motor for driving the rotary polyhedron. That is, the scanning speed of the scanning unit is controlled.

Figure 8C:
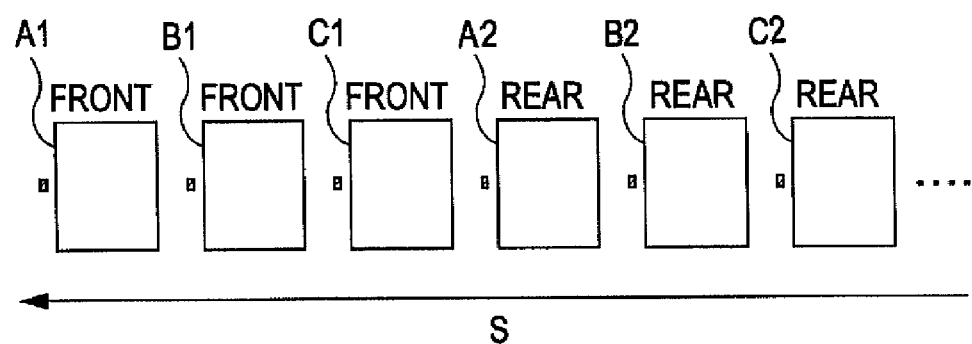
FIG. 8C is an explanatory view of the printing on both sides of different kind sheets.

FIG. 8C shows an image plane when printing images on both sides of different kinds of sheets. That is, the image plane is shown when a cardboard A, a thin sheet B, and a plain sheet C are sequentially and repeatedly fed from the cassettes 21*a*, 21*b*, and 21*c*, respectively. Arrow S denotes the proceeding direction of images; symbols A1 and A2 denote images to be transferred on the cardboard fed from the cassette 21*a*; symbols B1 and B2 denote images to be transferred on the thin sheet fed from the cassette 21*b*; symbols C1 and C2 denote images to be transferred on the plain sheet fed from the cassette 21*c*. When the image magnification on the front side of the cardboard herein is set at 101.00%, that on the front side of the thin sheet is set at 103.00%, that on the front side of the plain sheet is set at 102.00%, that on the rear side of the card board is set at 99.90%, that on the rear side of the thin sheet is set at 99.70%, and that on the rear side of the plain sheet is set at 99.80%, the rotary polyhedron (scanning unit) is controlled in speed by controlling the motor for driving the rotary polyhedron for changing the image magnification between the respective images. That is, the scanning speed of the scanning unit is controlled.

The speed control of the polygon motor shown in FIGS. 8A to 8C is used for controlling the magnification in the image secondary scanning direction. After the change, three adjustments follow: (A) the adjustment of the magnification rate in the primary scanning direction; (B) the adjustment of the writing start position off-set in the primary scanning direction; and (C) the adjustment of the writing start position off-set in the secondary scanning direction.

A case where the magnification rate is 101% (×=1.01 rate) in both the primary and secondary scanning directions and the rotation period of the polygon motor is retarded by 1% (×=101/100 period) will be described with reference to FIG. 20.

Figure 20:
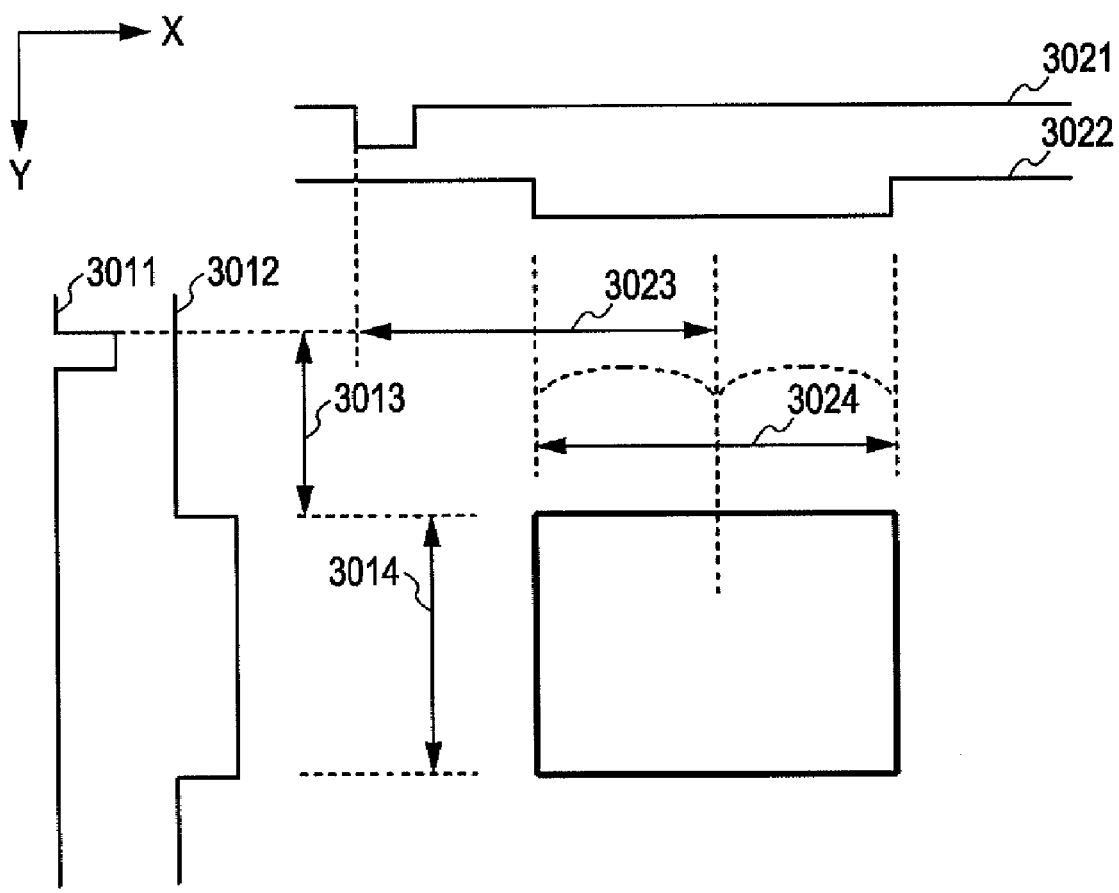
FIG. 20 is a schematic view of the image data arrangement and the signal temporal axis according to the embodiment.

FIG. 20 is a schematic view showing an image data distribution example and a synchronous signal time corresponding to the arrangement.

Reference numeral 3011 denotes a leading edge signal of the secondary scanning; numeral 3012 an effective image region signal of the secondary scanning; numeral 3013 a retardation period from the leading edge signal of the secondary scanning to the start of the image forming; numeral 3014 an effective image region of the secondary scanning; numeral 3021 a leading edge BD signal of the primary scanning; numeral 3022 an effective image region signal of the primary scanning; numeral 3023 a center time that is a retardation period from the leading edge signal of the primary scanning to the center of the image data; and numeral 3024 an effective image region of the primary scanning. Y-direction is an integer temporal axial direction corresponding to the position of the image data of the number of secondary scanning lines, and the Y-direction corresponds to the surface of the polygon mirror and the laser scanning line unit. X-direction is a decimal temporal axial direction corresponding to an image clock and image data during the primary scanning, and the X-direction is defined as the clock number from the primary scanning time and the BD signal 3021.

In the adjustment (A), when the polygon motor speed is reduced by 1%, unless the image clock (the clock signal indicating a time unit equivalent to a laser lighting time corresponding to one pixel data in the primary scanning line) is changed, a contraction of 1% in the primary scanning direction is generated unintentionally. Then, in order to increase the magnification in the primary scanning direction to 101% in the same as that in the secondary scanning direction, the image clock period is set at ×101/100×101/100=+2.01% (×1.0201 times).

In the adjustment (B), when the polygon motor speed is reduced by 1% and the image clock is delayed according to the adjustment (A), the center time 3023 from the BD signal 3021 to the image center is changed, so that the writing start position is moved to the right by the center time ×1% in the primary scanning direction unintentionally. Then, in order to prevent the center position from moving according to the magnification, the center time 3023 is set at ×100/101=−0.99% (×0.9901 times).

The change of the image clock described above is performed by a crystal oscillator circuit with a reference image clock frequency in the pulse width modulator 407 shown in FIG. 3 and a frequency modulation circuit.

(7) Speed Control of Motor Driving Rotary Polyhedron

Now, the speed control of the driving motor of the rotary polyhedron performed between pages for changing in image magnification will be described.

Figure 9:
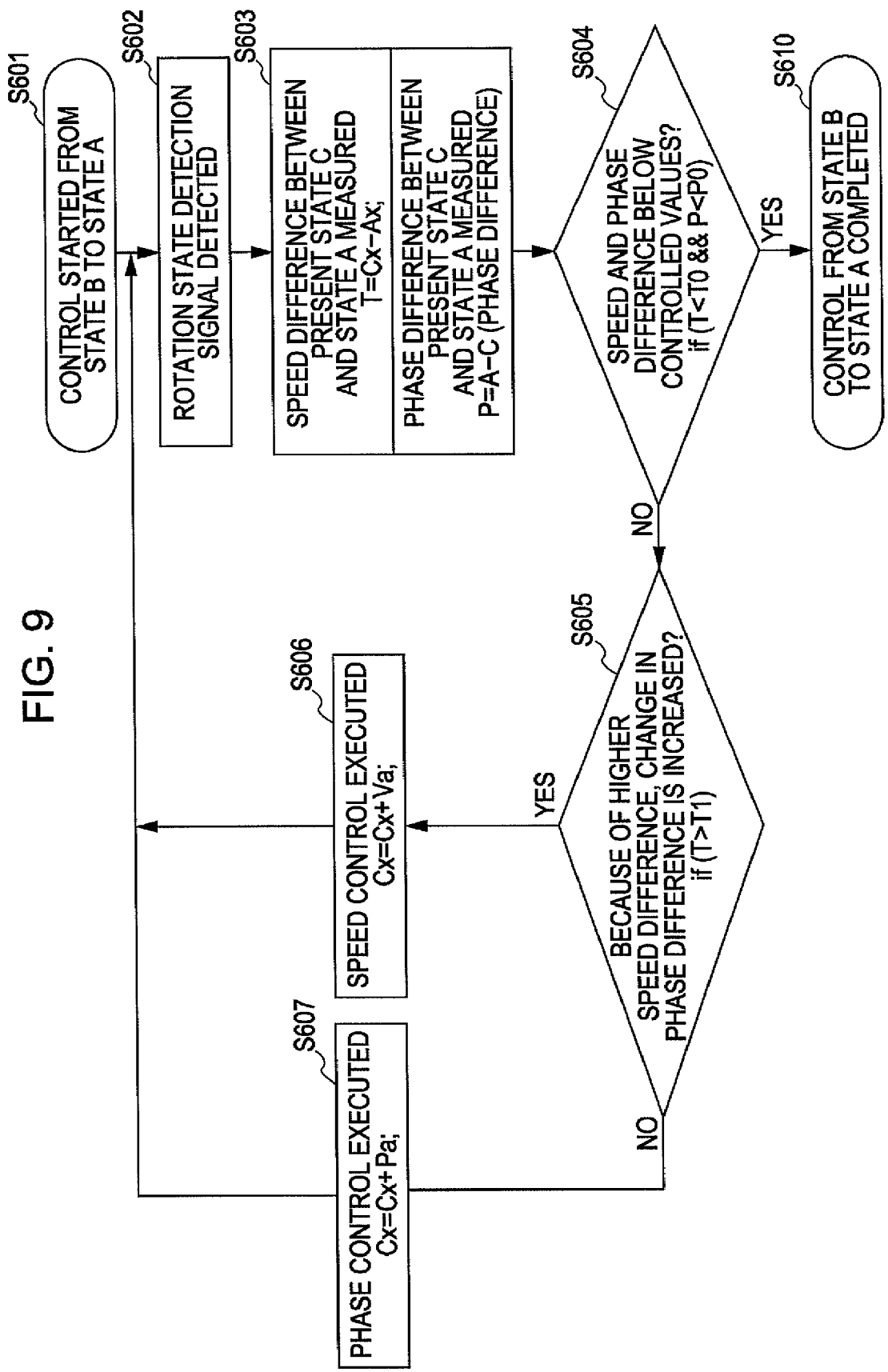
FIG. 9 is a flowchart showing a method of changing the speed of a polygon motor according to the embodiment.
Figure 14:
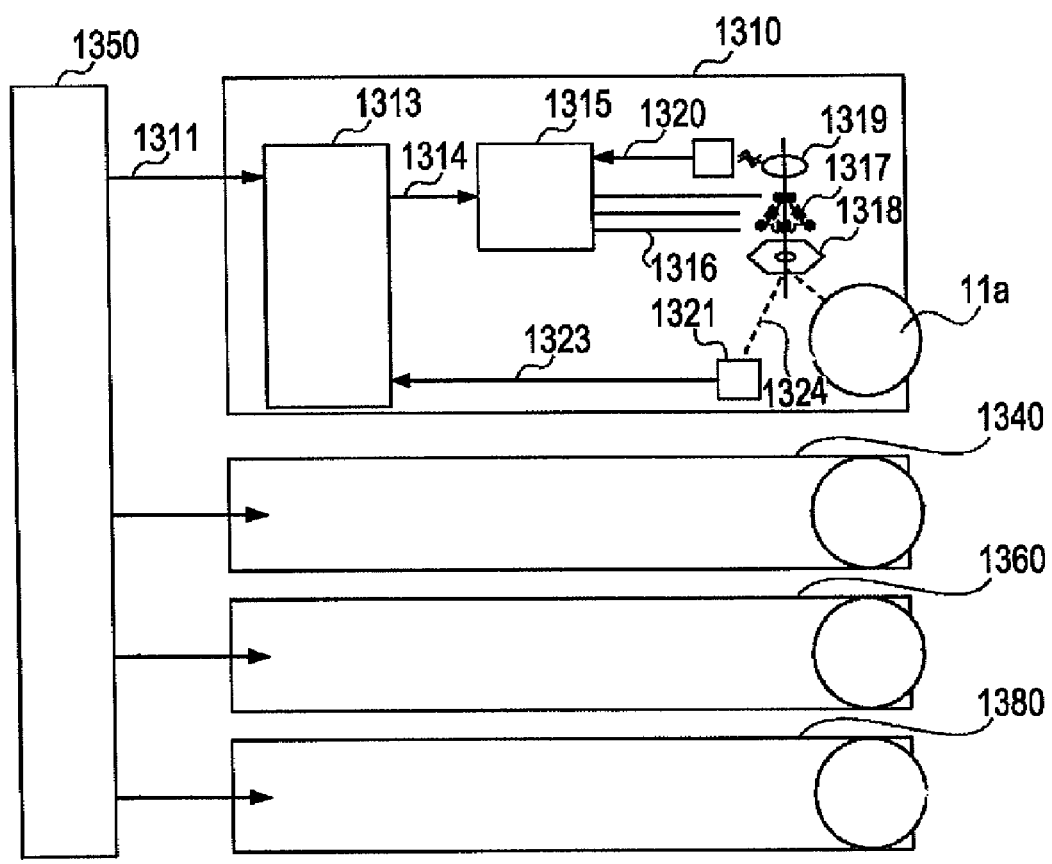
FIG. 14 is a block diagram of a polygon motor speed changing control unit according to the embodiment.

FIG. 9 is a flowchart of the feedback control when the speed is controlled to change the state A of the motor rotating speed and the rotary phase to the state B of the motor rotating speed and the rotary phase. FIG. 14 shows a configuration of the control unit for controlling the driving motor of the rotary polyhedron, which is included in the device control unit 314 shown in FIG. 2.

The configuration of FIG. 14 will be simply described.

A circuit 1350 is for producing a reference signal of the rotation speeds and the phases of four motors (referred to as a rotation reference signal below) and a control unit 1310 is for controlling a first motor (the speed control unit), wherein the configuration is shown inside. Reference numeral 1311 denotes the rotation reference signal; numeral 1312 a BD (i.e. beam detection) signal obtained by scanning the rotary polyhedron with a laser beam; numeral 1314 an acceleration/deceleration instruction signal; numeral 1313 a control calculating unit for producing the acceleration/deceleration instruction signal 1314 from the difference between the rotation reference signal 1311 and the BD signal 1323 which are received at the same time.

Reference numeral 1315 denotes a motor driver; numeral 1317 an exciting coil of the motor; numeral 1316 phase excitation for supplying an electric current to the exciting coil 1317; numeral 1318 a polygon mirror that is a rotating polyhedron; numeral 1319 a permanent magnet of the motor; numeral 1320 an FG (frequency generator) signal; numeral 1324 an imaginary drawing of a laser beam path; numeral 11a a photosensitive drum; and numeral 1321 a BD (beam detection) sensor.

Reference numerals 1340, 1360, and 1380 denote control units (speed control units) of second, third, and fourth motors, respectively, wherein the same configuration as that of the first motor unit is repeated inside, so that detailed description is omitted.

FIG. 9 is an explanatory view of the motor control flow. A CPU 311 performs each control on the basis of the programs stored in a ROM 313. First, there is generated a situation S601 wanting to change the state from the initial stable rotation state B to the state A with a different speed. For easier understanding, a state C and a periodic signal example of the state A are shown in FIG. 10. The state C is the present state, which agrees with the state B at the start of the control, and after the completion of the control, it agrees with the state A. The periods of the state C and the state A are indicated as Cx and Ax, respectively. Since the speed is different in this case, the period is also different. In the respective states B and A, the speed and the phase are established in association with the image printing, so that the phase relationship is not arbitrary and the respective phases are fixed to an absolute time. The specific numeric values herein are Cx=1050 μs and Ax=1000 μs, considering 5% magnification modulation.

Then, detection S602 is executed with a rotation state detection signal. Specifically, there are a rotation synchronization signal (referred to as an FG signal below) obtained from a polar signal of a DC brushless motor and a Hall device, and a rotary polyhedron plane-position detection sensor signal (referred to as a BD signal below), the detection sensor comprising a rotary polyhedron, an irradiation laser beam, and a reflection light sensor.

Next, the measurement of the speed difference and the phase difference and the calculation S603 are executed based on the detected timings. The differences from the targeted phase and speed are measured. The differences are digitally measured with a crystal oscillator output (0.1 μs), which is sufficiently smaller in period than the BD period (1000 μs, for example), and a counter of a clock periodic sequential circuit operated by the crystal oscillator, at the periodic time of the state C or the state A. The measured results are expressed as follows:

Present speed difference $T=Cx-Ax$,

Present phase difference $P=\text{refA}$ (shown in FIG. 10).

Then, the completion determination S604 of the state change control is performed. In regard to the residual speed TO and the residual phase PO, the following condition is determined:

If $((|T|<T0) \text{ AND } (|P|<P0))$.

When the above condition is satisfied, the control is shifted to the stable state so as to complete the state change control (S610). If the condition is not satisfied, the process is shifted to select acceleration/deceleration executing means (S605).

In a conventional control, when the speed difference is large, the phase difference is determined to be meaningless. In particular, when the speed difference is doubled or more, two or more periodic signals of a short-period exist within one long-period, so that the measuring method of the phase difference also needs a condition. The speed control is executed (S606) if the following condition is satisfied for a speed residual threshold value T1: $(|T|>T1)$.

If this condition is not satisfied, the phase control is executed (S607). The speed control S606 herein indicates to accelerate/decelerate the rotation in a direction allowing the speeds to agree, regardless of the phase. The phase control S607 herein indicates to accelerate/decelerate the rotation in a direction allowing the phase to agree, regardless of the speed. The two controls may be simultaneously executed in some method; when the control directions of both the controls are different, the speed control has priority by combining a gain size ratio.

Figure 11A:
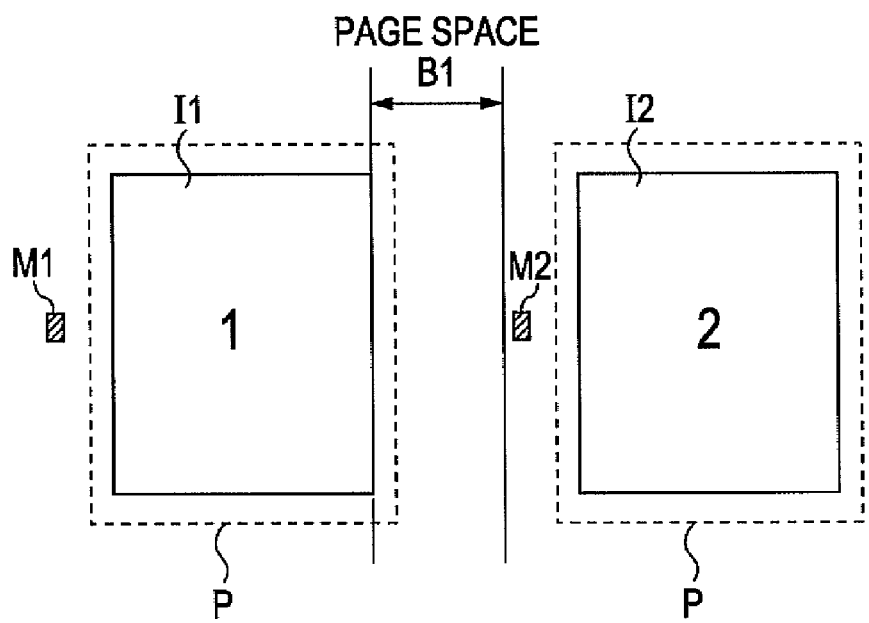
FIG. 11A is a schematic view showing the image positional relationship when the speed of the polygon motor is changed in a page space.

Next, the image positional relationship when the speed of the motor driving the rotary polyhedron is controlled in between pages will be described with reference to FIG. 11A. Reference numeral I1 denotes images on a first page; numeral M1 the edge mark of the images I1; numeral I2 images on a second page; numeral M2 the edge mark of the images I2; and character P a region corresponding to a sheet. The motor speed control is started from the trailing edge of the first-page images I1 and upon completion of the speed change, the edge mark M2 of the next images can be printed, so that the page space becomes B1. That is, the page space corresponding to the time required for the speed change is B1.

(8) Patch for Adjusting Images

Next, the patch formed in between pages for adjusting images will be described.

Figure 13A:
FIG. 13A is a drawing showing a resist patch.
Figure 13B:
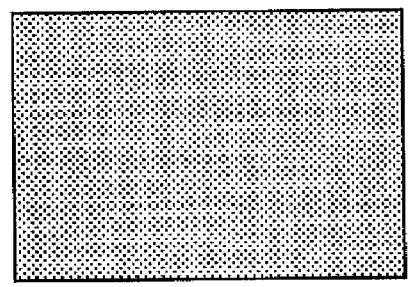
FIG. 13B is a drawing showing an image density adjusting patch.
Figure 13C:
FIG. 13C is a drawing showing a position adjusting patch.

FIG. 13A is a drawing of a resist patch for detecting color misalignment; FIG. 13B is a drawing of a density adjusting patch for detecting density misalignment; and FIG. 13C is a drawing of a position adjusting patch for detecting positional misalignment. In these patches, patch image data are produced by the pattern generator 430 shown in FIG. 3. The resist patch, as shown in FIG. 13A, is composed of a pattern R1 of magenta, which is a reference color, and another-color pattern (yellow R2, in the drawing), and the displacement relative to the reference magenta can be measured. The magenta resist patch is sequentially formed in between pages (between sheets) in combination with another color.

A method for obtaining the displacement relative to the reference-color magenta will be described with reference to FIG. 12. In the formed resist pattern, distances A1, A2, B1, and B2 are detected by the patch detection sensor 80. The displacement relative to the magenta in the primary scanning direction ΔH and that in the secondary scanning direction ΔV are calculated in conformity with the following equations:

$$\Delta H=\{(B2-B1)/2-(A2-A1)/2\}/2\} \quad \text{equation 1}$$

$$\Delta V=\{(B2-B1)/2+(A2-A1)/2\}/2\} \quad \text{equation 2.}$$

These results are reflected to the next image forming.

Figure 12:
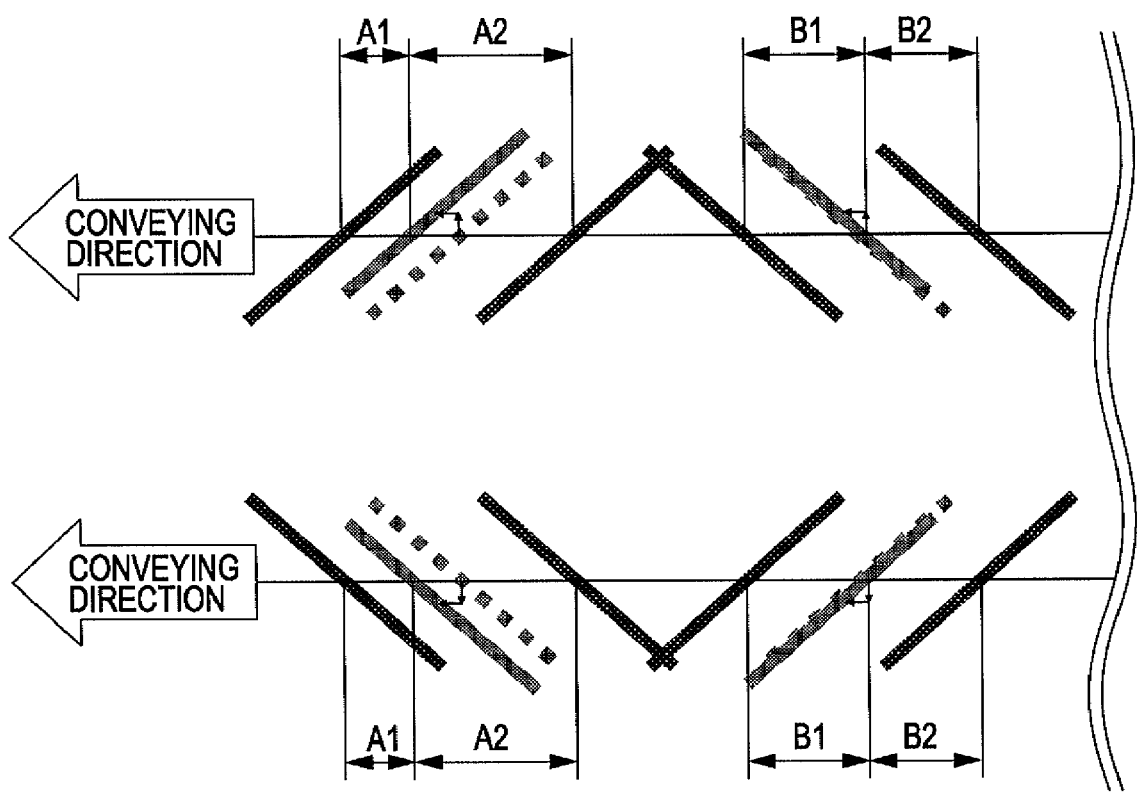
FIG. 12 is a drawing for illustrating the detecting of color image misalignment according to the embodiment.

In FIG. 12, another patch is differently arranged in the primary scanning direction, and by providing another resist pattern with the same shape and another patch detection sensor in positions of mirror symmetry in the primary scanning direction, a magnification difference M to magenta in the primary scanning direction and a scanning line inclination R are also calculated.

In the density adjusting patch, the density is read by the patch detection sensor 80 and the image density is corrected in accordance with the read density in the image correction unit 420.

In the position adjusting patch, the position relative to a recording sheet is read by the patch detection sensor 80 and the position at which images are formed is corrected in accordance with the read position.

The resist patch, the density adjusting patch, and the position adjusting patch, which are the image adjusting patch, are sequentially formed in between pages during printing job. They herein are formed at intervals of predetermined pages. According to the embodiment, the density adjusting patch is formed in between pages after an odd pages and the resist patch is formed in between pages after an even page, at intervals of 100 pages. They may also be formed in between every page, as will be described later.

Figure 11B:
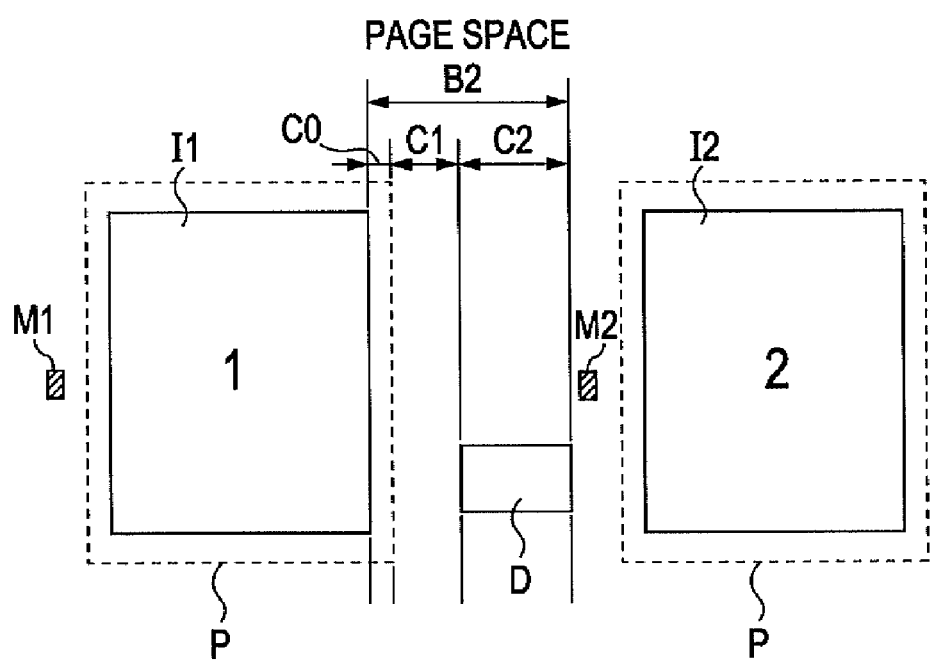
FIG. 11B is a schematic view showing the image positional relationship when a patch for image adjustment is formed in a page space.

Now, the image positional relationship when the image adjusting patch is formed in between pages will be described with reference to FIG. 11B. Since the motor speed change is not assumed herein, the page space B1 for the speed change is not considered. Reference numeral I1 denotes images on a first page; numeral M1 the edge mark of the images I1; numeral I2 images on a second page; numeral M2 the edge mark of the images I2; character D an image adjusting patch; and character P a region corresponding to a sheet.

Reference character C0 denotes a trailing-edge white space of images formed on the recording sheet P; character C1 a toner scattering prevention region for preventing the toner of the image adjusting patch D from scattering over the recording sheet P; and character C2 a length of the image adjusting patch D in the secondary scanning direction. A page space B2 is expressed by:

$$B2=C0+C1+C2.$$

(9) A Case when Both Speed Change of Motor Driving Rotary Polyhedron and Forming Image Adjusting Patch Are Performed Next, a case when both the speed change of the motor driving the rotary polyhedron and forming the image adjusting patch are performed between pages will be described with reference to FIGS. 15A and 15B.

For example, when the image magnification of the front side is different from that of the rear side during two-sided printing, a motor speed change is required for changing the image magnification between the front side images and the rear side image or between pages of the front side images and the rear side images, as described above. During one-sided printing, when the image magnification is different in both the front sides depending on the kind of sheet, a motor speed change is required for changing the image magnification between pages of different kinds.

For forming the image density adjusting patches in between pages after odd pages, both the motor speed change and the forming of the image adjusting patch need to be performed in between the common pages (between the common sheets).

Figure 15A:
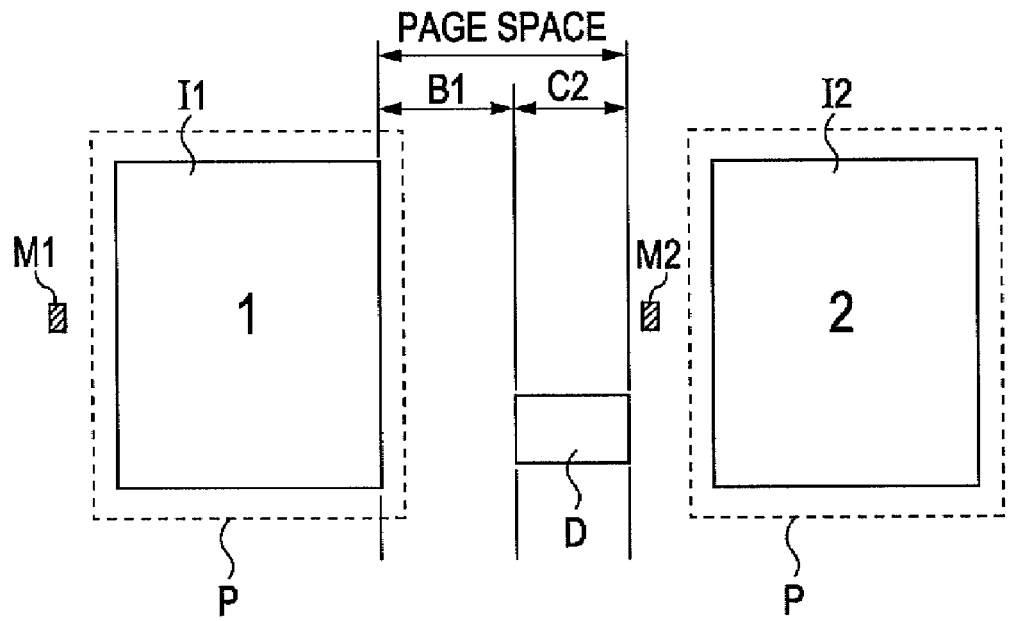
FIG. 15A is a drawing showing the image positional relationship when the speed of the polygon motor is first changed.

FIG. 15A shows the image positional relationship when the image adjusting patch is formed after the motor speed is changed. Reference numeral I1 denotes images (a first region) on a first page; numeral M1 the edge mark of the images I1; numeral I2 images (a second region) on a second page; numeral M2 the edge mark of the images I2; character D an image adjusting patch (a pattern image formed at a second scanning speed); character P a region corresponding to a sheet; character B1 a speed changing region of the motor driving the rotary polyhedron; and character C2 a length of the image adjusting patch D in the secondary scanning direction. Referring to FIG. 15A, the motor speed control is started from the trailing edge of the first-page images and upon completion of the speed change, in order to form the image adjusting patch, the space between the first page and the second page is to be B1 (the space corresponding to the time required for the speed change) +C2.

Figure 15B:
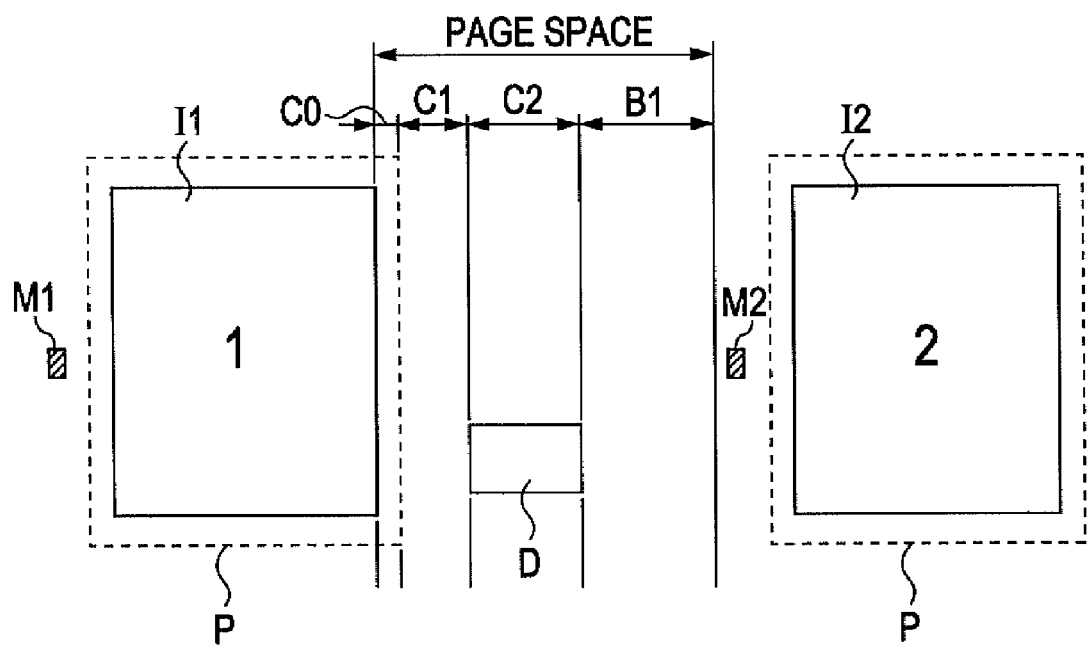
FIG. 15B is a drawing showing the image positional relationship when the image density adjusting patch is first formed.

On the other hand, as another method, FIG. 15B shows the image positional relationship when the motor speed is changed after the image adjusting patch is formed in between pages. Reference numeral I1 denotes images (a second region) on a first page; numeral M1 the edge mark of the images I1; numeral I2 images (a first region) on a second page; numeral M2 the edge mark of the images I2; character D an image adjusting patch (a pattern image formed at a second scanning speed); character P a region corresponding to a sheet; character C0 a trailing-edge white space of images formed on the recording sheet P; character C1 a toner scattering prevention region for preventing the toner of the image adjusting patch D from scattering over the recording sheet P; character C2 a length of the image adjusting patch D in the secondary scanning direction; and character B1 a speed changing region of the motor. Referring to FIG. 15B, the space between the first page and the second page is to be C0 +C1 +C2 +B1, so that it is apparent that the page space shown in FIG. 15A is shorter than that in FIG. 15B.

That is, when the image adjusting patch is formed after the motor speed is changed, the toner scattering prevention region C1 for preventing the toner of the image adjusting patch D from scattering over the recording sheet P and the trailing-edge white space C0 are not necessary, which are required when the image adjusting patch is formed before the motor speed is changed. That is, the speed changing region of the motor B1 can also serve the function of the toner scattering prevention region C1. Furthermore, in the method of FIG. 15B, the trailing-edge white space C0 formed on the recording sheet P must be considered. Whereas when the motor speed is changed in advance, since the motor speed can be changed directly after the forming the images I1, the trailing-edge white space C0 can also be omitted. When the motor speed is changed in advance, the page space can be reduced by C0 +C1, so that it is understood that this method be more advantageous.

Figure 16:
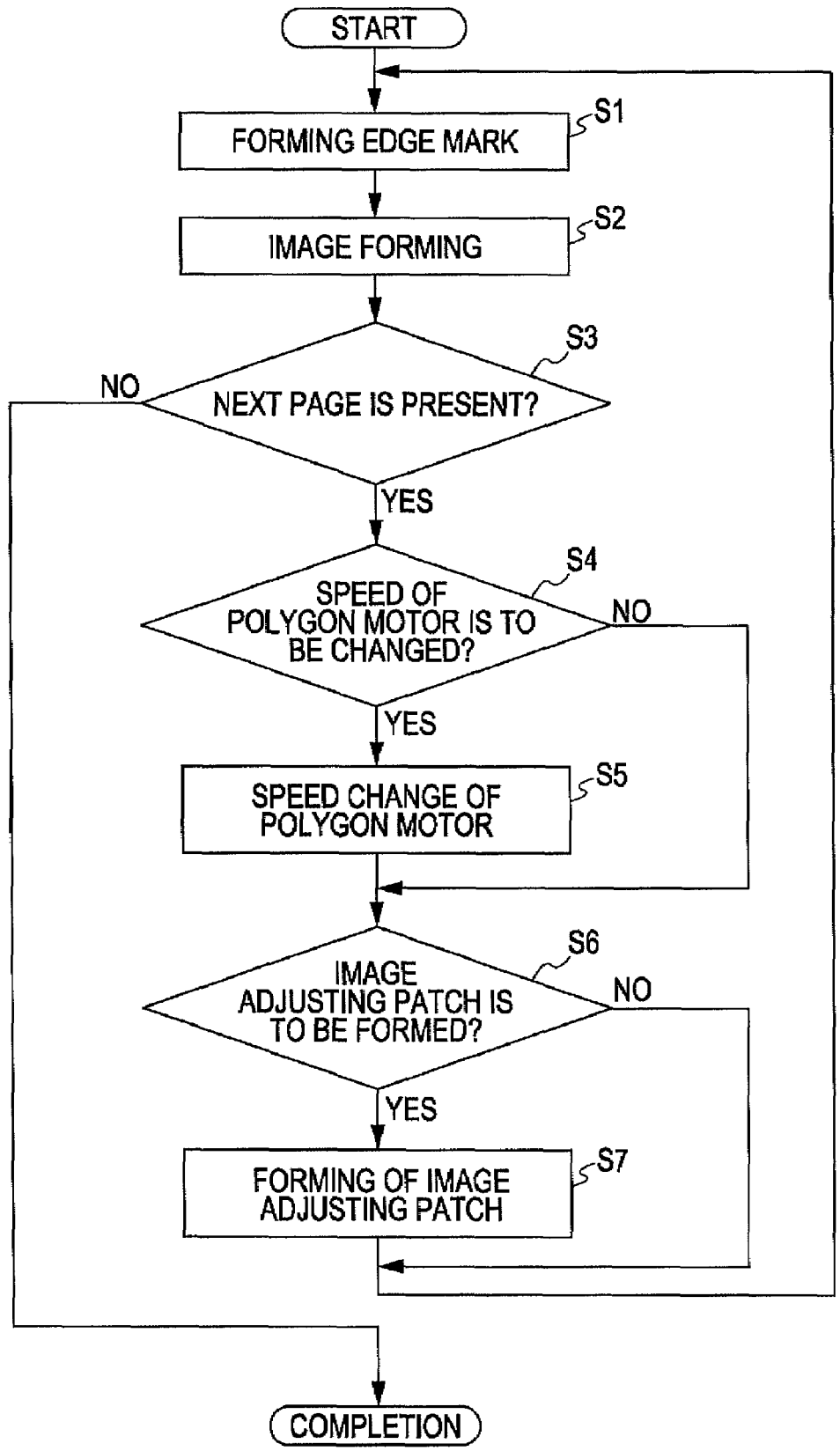
FIG. 16 is a flowchart of the page-space processing according to the embodiment.

Now, a method for changing the motor speed and for forming the image adjusting patch in between pages will be described with reference to the flowchart of FIG. 16. Upon starting of the printing, at Step S1 of FIG. 16, the image forming apparatus forms an edge mark for the next images.

Then, at Step S2, images are formed for transfer onto the sheet. Upon completion of the image forming, the presence of the next page is determined at Step S3; if it is determined to be absent, the process is completed, and if it is determined to be present, the process proceeds to Step S4. At Step S4, the image magnification of the page, on which the image-formation established in the numeral 823 of FIG. 6C is completed, is compared with the image magnification of the next images similarly established in the numeral 823 of FIG. 6C. If the result is to be different, after the motor speed is changed for the following images at Step S5, the process proceeds to Step S6. If the compared result is the same at Step S4, the process directly proceeds to Step S6. At Step S6, it is determined whether the image adjusting patch is to be formed or not; when the image adjusting patch is to be formed, the process proceeds to Step S7. At Step S7, when the image magnification of the page having already formed images is the same as that of the next page, since the motor speed has not been changed, the image adjusting patch is formed by keeping it by the distance C0 +C1 of FIG. 11B for securing the toner scattering prevention region. If the image magnification is different, since the motor speed has been changed, it is not necessary to secure the toner scattering prevention region, so that the image adjusting patch is formed immediately after the speed change, and the process again proceeds to Step S1 for image forming of the next page.

(10) The Timing for Performing both Speed Change of Motor Driving Rotary Polyhedron and Forming Image Adjusting Patch Like FIG. 8A mentioned above, a case is shown in which different kinds of sheets are alternately fed so as to print images thereon. In this case, cardboard sheets and plain sheets are alternately fed from the cassettes 21a and 21b, respectively; the image magnification on the front side of the cardboard is set at 100.00% (images formed at the second scanning speed), and that of the plain sheet is set at 99.98% (images formed at the first scanning speed); and the image adjusting patch is formed after the motor speed is changed.

In this case, when images are adjusted in between pages after the even page (b1 herein), the image adjusting patch is formed at the motor speed with 100.00% image magnification (the second scanning speed). Thereby, the image adjusting patch with 100.00% image magnification is formed every other page. Also in this case, in between pages after the odd page, the image adjusting patch is not formed. Namely, when the image magnification is 100.00%, the image adjusting patch is formed while when the image magnification is not 100.00%, the image adjusting patch is not formed. Thereby, because of the 100.00% image magnification, the conversion to the 100.00% image magnification is not necessary, so that the page space without the image adjusting patch can be shortened. While the resist pattern is being formed during continuous printing, an image forming job having several mixed kinds of image magnification can be executed with the minimum page space having sandwiched reference marks (resist pattern) for detecting misalignment. Thereby, the high-speed and high-quality image forming can be executed without interrupting the continuous printing by suppressing misalignment to the minimum. Also, the registration correction can be performed with high accuracy without applying excessive load to components of the image forming apparatus.

When images are adjusted in between pages after the odd page (a1 herein), they are formed every other page. Thereby, the image adjusting patch with 99.98% image magnification is formed every other page. Also in this case, in between pages after the even page, the image adjusting patch is not formed. Namely, when the image magnification is 99.98%, the image adjusting patch is formed while when the image magnification is not 99.98%, the image adjusting patch is not formed. Thereby, because of the 99.98% image magnification, even when the conversion to the 100.00% image magnification is necessary, in the same way as described above, the page space without the image adjusting patch can be shortened (the magnification converting method will be described later). While the resist pattern is being formed during continuous printing, an image forming job having several mixed kinds of image magnification can be executed with the minimum page space having sandwiched reference marks (resist pattern) for detecting misalignment.

In FIG. 8A mentioned above, the motor speed is to be changed after the forming of the image adjusting patch. In this case, when images are adjusted in between pages after the odd page (a1 herein), the image adjusting patch is to be formed at the motor speed with 100.00% image magnification (the second scanning speed). Thereby, the image adjusting patch with 100.00% image magnification is formed every other page. Also in this case, in between pages after the even page, the image adjusting patch is not formed. Namely, when the image magnification is 100.00%, the image adjusting patch is formed so as to execute the image adjustment while when the image magnification is not 100.00%, the image adjusting patch is not formed.

Thereby, high-speed and high-quality image forming can be executed without interrupting continuous printing by suppressing misalignment to the minimum.

Because of the alternate sheet feeding herein, the image adjusting patch is formed every other page; however, the forming intervals are not limited to every other page as long as the image adjusting patch is formed when the magnification is the same.

Like FIG. 8B mentioned above, a case is shown in which the same kind of sheets are fed so as to print images on both sides. In this case, a plain sheet is fed from the cassette 21a; images are formed on the both sides; and the image magnification on the front side of the plain sheet is set at 100.00% (images formed at the second scanning speed), and that on the rear side of the plain sheet is set at 99.97% (images formed at the first scanning speed).

In this case, when the image adjusting patch is formed at the motor speed with 100.00% image magnification (the second scanning speed), the image adjusting patch with 100.00% image magnification is formed every other page. Also in this case, in between pages after the following page, i.e., when the image magnification is not 100.00%, the image adjusting patch is not formed. Namely, when the image magnification is 100.00%, the image adjusting patch is formed so as to execute the image adjustment while when the image magnification is not 100.00%, the image adjusting patch is not formed. Thereby, because of the 100.00% image magnification, the conversion to the 100.00% image magnification is not necessary, so that the page space without the image adjusting patch can be shortened. While the resist pattern is being formed during continuous printing, an image forming job having several mixed kinds of image magnification can be executed with the minimum page space having sandwiched reference marks (resist pattern) for detecting misalignment. Thereby, high-speed and high-quality image forming can be executed without interrupting the continuous printing by suppressing misalignment to the minimum. Also, registration correction can be performed with high accuracy without applying excessive load to components of the image forming apparatus.

When the image adjusting patch (the pattern image formed at the second scanning speed) is formed at the motor speed with 99.97% image magnification (the second scanning speed), the image adjusting patch with 99.97% image magnification is formed every other page. Also in this case, in between pages after the even page, the image adjusting patch is not formed. Namely, when the image magnification is 99.97%, the image adjusting patch is formed so as to execute the image adjustment while when the image magnification is not 99.97%, the image adjusting patch is not formed. Thereby, because of the 99.97% image magnification, even the conversion to the 100.00% image magnification is necessary, in the same way as described above, the page space without the image adjusting patch can be shortened (the magnification converting method will be described later). While the resist mark is being formed during continuous printing, an image forming job having several mixed kinds of image magnification can be executed with the minimum page space having sandwiched reference marks for detecting misalignment. Thereby, high-speed and high-quality image forming can be executed without interrupting the continuous printing by suppressing misalignment to the minimum.

Like FIG. 8C mentioned above, a case is shown in which different kinds of sheets are fed so as to print images on both sides. In this case, a cardboard sheet A, a thin sheet B, and a plain sheet C are sequentially and repeatedly fed from the cassettes 21a to 21c, respectively; the image magnification on the front side of the cardboard is set at 101.00%, that on the front side of the thin sheet is set at 103.00%, that on the front side of the plain sheet is set at 102.00%, that on the rear side of the cardboard is set at 99.90%, that on the rear side of the thin sheet is set at 99.70%, and that on the rear side of the plain sheet is set at 99.80%.

In this case, when the image magnification is the same, when it is at 101.00% only, for example, the image adjusting patch may be formed, while when the image magnification is different, the image adjusting patch may not be formed. That is, when the image magnification has a predetermined value, the image adjusting patch is formed so as to execute the image adjustment, while when the image magnification has a value other than the predetermined value, the image adjusting patch is not formed. Thereby, if the image magnification value is 100.00%, the conversion to the 100.00% image magnification is not necessary; if the image magnification value is not 100.00%, even the conversion to the 100.00% image magnification is necessary, in the same way as described above, the page space without the image adjusting patch can be shortened.

With increasing mixed image magnification, the number of times to form the image adjusting patch is reduced, so that although the accuracy is less than that in the above-description, the system has a higher image forming speed. While the resist pattern is being formed during continuous printing, an image forming job having several mixed kinds of image magnification can be executed with the minimum page space having sandwiched reference marks (resist pattern) for detecting misalignment. Thereby, high-speed and high-quality image forming can be executed without interrupting the continuous printing by suppressing misalignment to the minimum. Also, registration correction can be performed without applying excessive load to components of the image forming apparatus.

In order to improve the accuracy, with a plurality of image magnifications, such as 101.00%, 102.00%, and 99.90%, the image adjusting patch may be formed, and with other image magnifications (103.00%, 99.70%, and 99.80% herein), the image adjusting patch may not be formed.

Furthermore, by forming the image adjusting patch with the total image magnifications to be used (99.70%, 99.80%, 99.90%, 101.00%, 102.00%, and 103.00% herein), the number of times to form the image adjusting patch is increased and the accuracy can be further improved. Thereby, high-speed and high-quality image forming can be executed without interrupting the continuous printing by suppressing misalignment to the minimum. Also, registration correction can be performed with high accuracy.

(11) Correction Using Image Adjusting Patch

Figure 17:
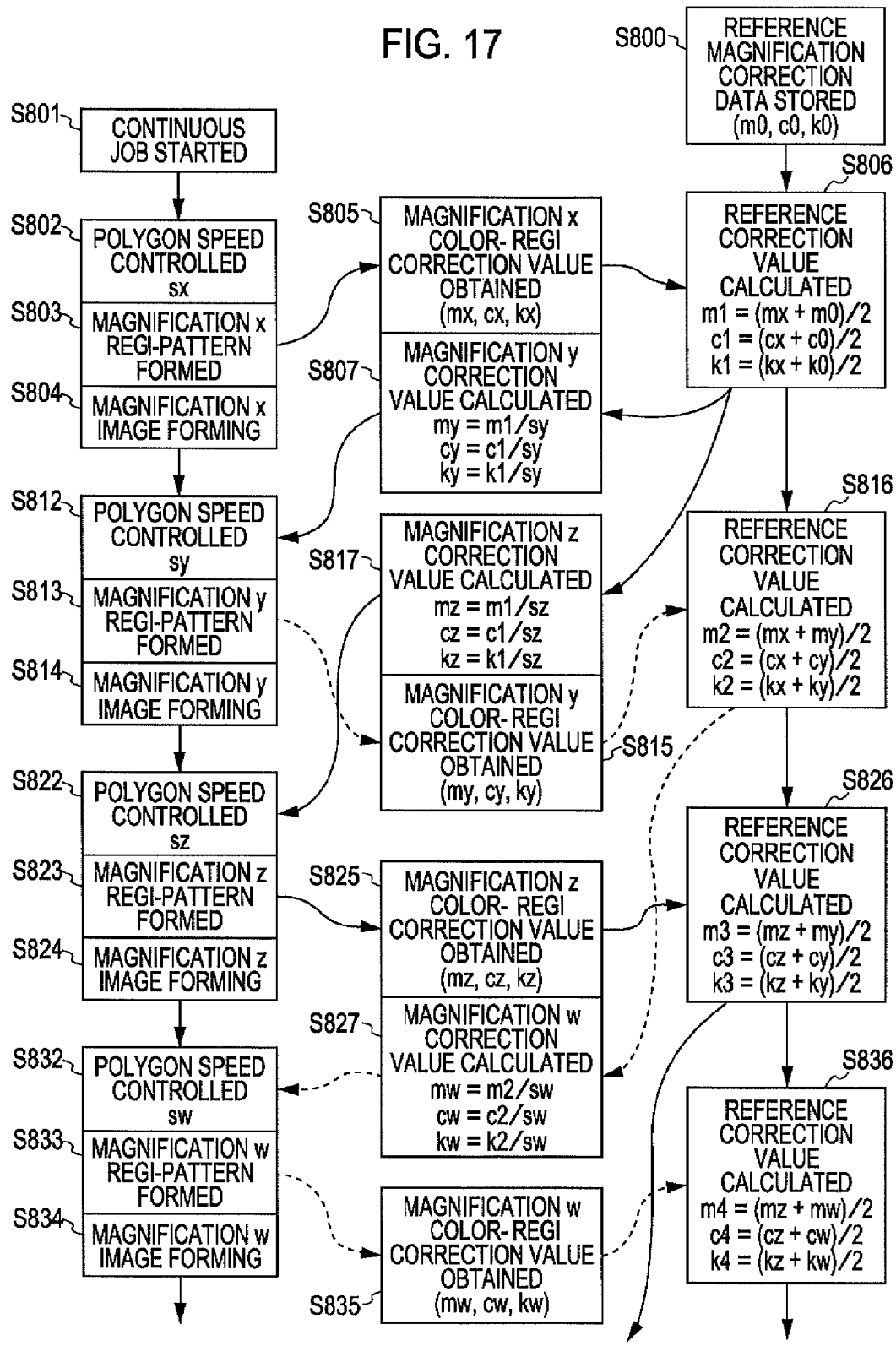
FIG. 17 is a flowchart of the continuous page printing according to the embodiment.

FIG. 17 is a drawing of the continuous page printing operation by the image forming apparatus. For example, a case is assumed where both sides of different kinds of sheets are printed as shown in FIG. 8C. A cardboard sheet A, a thin sheet B, and a plain sheet C are sequentially and repeatedly fed from the cassettes 21a, 21b, and 21c, respectively. The image magnification on the front side of the cardboard herein is set at 101.00%, that on the front side of the thin sheet is set at 103.00%, that on the front side of the plain sheet is set at 102.00%, that on the rear side of the cardboard is set at 99.90%, that on the rear side of the thin sheet is set at 99.70%, and that on the rear side of the plain sheet is set at 99.80%.

The sequence is controlled by the CPU 311 in the printer control unit 59. In the continuous image forming of three pages with respective different image sizes and sheet types having magnifications x (101.00% the front side of the card board), y (103.00% the front side of the thin sheet), and z (102.00% the front side of the plain sheet), the feed back sequence of Y-color and color misalignment correction is shown in the drawing. The Y-color is formed prior to other colors at the start of the color image forming job, so that the M-, C-, and K-color are omitted herein. The operation of the color misalignment correction will be described with reference to FIG. 17.

In the correction sequence in FIG. 17, the continuous printing job of three pages with different magnifications is started at Step S801. At Step S802, the speed change and the phase control are executed in the optical unit adjusted to the magnification x. After the speed and phase of the optical unit are stabilized, the registration-pattern starts being printed at Step S803. At Step S804, the page image is formed with the magnification x.

Figure 21:
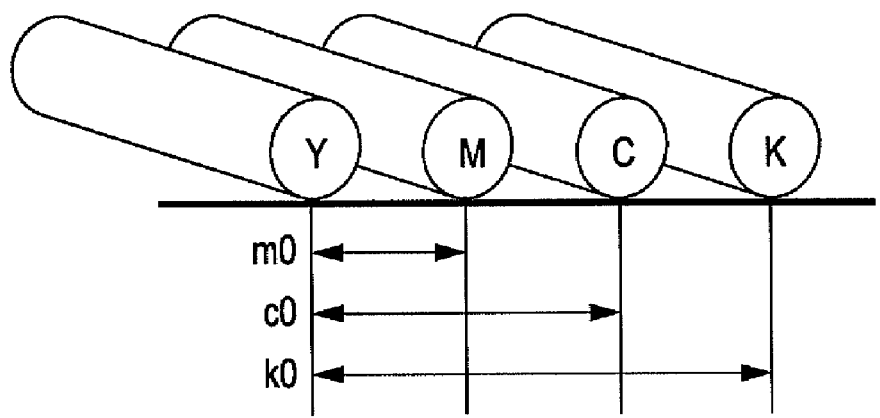
FIG. 21 is a physical imaging drawing of the secondary scanning position off-set (the retardation of the photosensitive drum) according to the embodiment.

At Step S805, correction values (mx, cx, and kx) are read from the registration pattern formed at Step S803. The values mx, cx, and kx are the correction values of the M-, C-, and K-color with the magnification x obtained in a correction calculation unit S301. The correction includes a secondary scanning magnification correction, a primary scanning magnification correction, a scanning diagonal line displacement, a correction of the secondary-scanning position off-set 3013, and a correction of the primary-scanning position off-set 3023 shown in FIG. 20. In the description below, the secondary-scanning position off-set is defined as m0, c0, and k0 as shown in FIG. 21 so as to represent a parameter for the correction group. These are retardations between photosensitive drums used for the reference magnification.

The reading of the correction is executed by forming the registration pattern described in (8) Patch for Adjusting Images and by the calculation of equation 2. At this time, the patch size to be formed is bitmap patch data based on the number of pixels defined by an image clock unit. With the reference magnification, this is a pattern with an inclination 45° and a pixel number ratio 1/1 of the primary scanning direction to the secondary scanning direction, as shown in FIG. 12. The reading of A1, A2, B1, and B2 by a sensor is obtained by converting a reading time interval of the patch position into a patch distance, under the condition that the conveying speed is constant.

The register pattern with the magnification x herein is printed at a factor of x over the reference magnification in both the primary and secondary scanning directions. Furthermore, the sensor reading time mentioned above is converted in consideration of the x-fold, and the calculated results of secondary scanning magnification corrections for each color Mm, Mc, and Mc are calculated based on an x-fold pixel. The obtained corrections mx, cx, and kx as the number of pixels are converted into the reference magnification corrections using the x-fold.

$$mx = m0 + Mm/x \qquad \text{equation 6-1}$$

$$cx = c0 + Mc/x \qquad \text{equation 6-2}$$

$$kx = k0 + Mk/x \qquad \text{equation 6-3}$$

At Step S806, the reference magnification corrections are averaged from the corrections (m0, c0, and k0) with the reference magnification 100% obtained in advance at Step S800 and the corrections (mx, cx, and kx) with magnification x (the rotary polyhedron scanning speed sx) obtained at Step S805 so as to obtain the reference corrections (m1, c1, and k1) which are present corrections.

$$m1 = (mx + m0)/2 \qquad \text{equation 7-1}$$

$$c1 = (cx + c0)/2 \qquad \text{equation 7-2}$$

$$k1 = (kx + k0)/2 \qquad \text{equation 7-3}$$

The corrections (m0, c0, and k0) with the reference magnification 100% obtained in advance at Step S800 may also be obtained at the apparatus start-up by turning on the power, or if the reference magnification at the start of the continuous job is 100%, the corrections may also be obtained at that time.

At Step S807, the my, cy, and ky, which are converted to the magnification y used for forming G-images with the magnification y, are obtained from the m1, c1, and k1 obtained at Step S806 prior to the job start (Step S812) with the next magnification y (the rotary polyhedron scanning speed sy).

$$my = m1/sy \qquad \text{equation 9-1}$$

$$cy = c1/sy \qquad \text{equation 9-2}$$

$$ky = k1/sy \qquad \text{equation 9-3}$$

At Step S812, the speed change and the phase control of the optical unit are executed based on the my, cy, and ky obtained at Step S807. After the speed and phase of the optical unit are stabilized, the registration pattern starts being printed at Step S813. At Step S814, the page images are formed with the magnification y. With the following different magnifications, the same process may be repeated.

Also, in printing with the magnifications y, z, and w, at Step S815, S816, S825, S826, S835, and S836, the present corrections m2, c2, k2, m3, c3, k3, m4, c4, and k4 are calculated.

At Step S817, the mz, cz, and kz, which are converted to the magnification z used for forming images with the magnification z, are obtained from the m1, c1, and k1 obtained at Step S806 prior to the job start (Step S822) with the next magnification z (the rotary polyhedron scanning speed sz).

In this example, for the feed back of the present reference corrections (m2, c2, and k2), the image size with the magnification y in the secondary scanning direction is small. Hence, the corrections cannot be obtained prior to the job start (S822) with the next magnification z, so that for the printing with the magnification z, the mz, cz, and kz converted into the magnification z at Step S817 using the previous corrections m1, c1, and k1 are used. The feed back of the present reference corrections (m3, c3, and k3) is not used for the job with magnification w, in the same way as the above.

Since the feed back of the correction depends on the size of the page images, although large-sized images may be fed back to the next images directly, the small-sized images may be fed back after one or more pages are processed.

Examples with different magnifications in all are shown herein; however, if the correction is performed only with 100% magnification, the correction is performed only with the reference magnification, eliminating the calculation of the magnification conversion.

As the correction with the magnification y and that with the magnification z are obtained at Step S807 and S817, respectively, from the value at Step S806, it is understood that corrections with a plurality of magnifications be obtained.

Thereby, the value read from the registration pattern printed with a plurality of magnifications is fed back to a predetermined reference magnification (initial values mo, c0, and k0 with the reference magnification 100% and zero number of detections of color misalignment herein). By averaging detected results of the last but one and the last color misalignments with the reference magnification, the present reference correction is obtained. Thereby, the newest detected results of the color misalignments are followed as well as the effect of the variations of an intermediate transfer belt can be suppressed to be small.

Figure 18C:
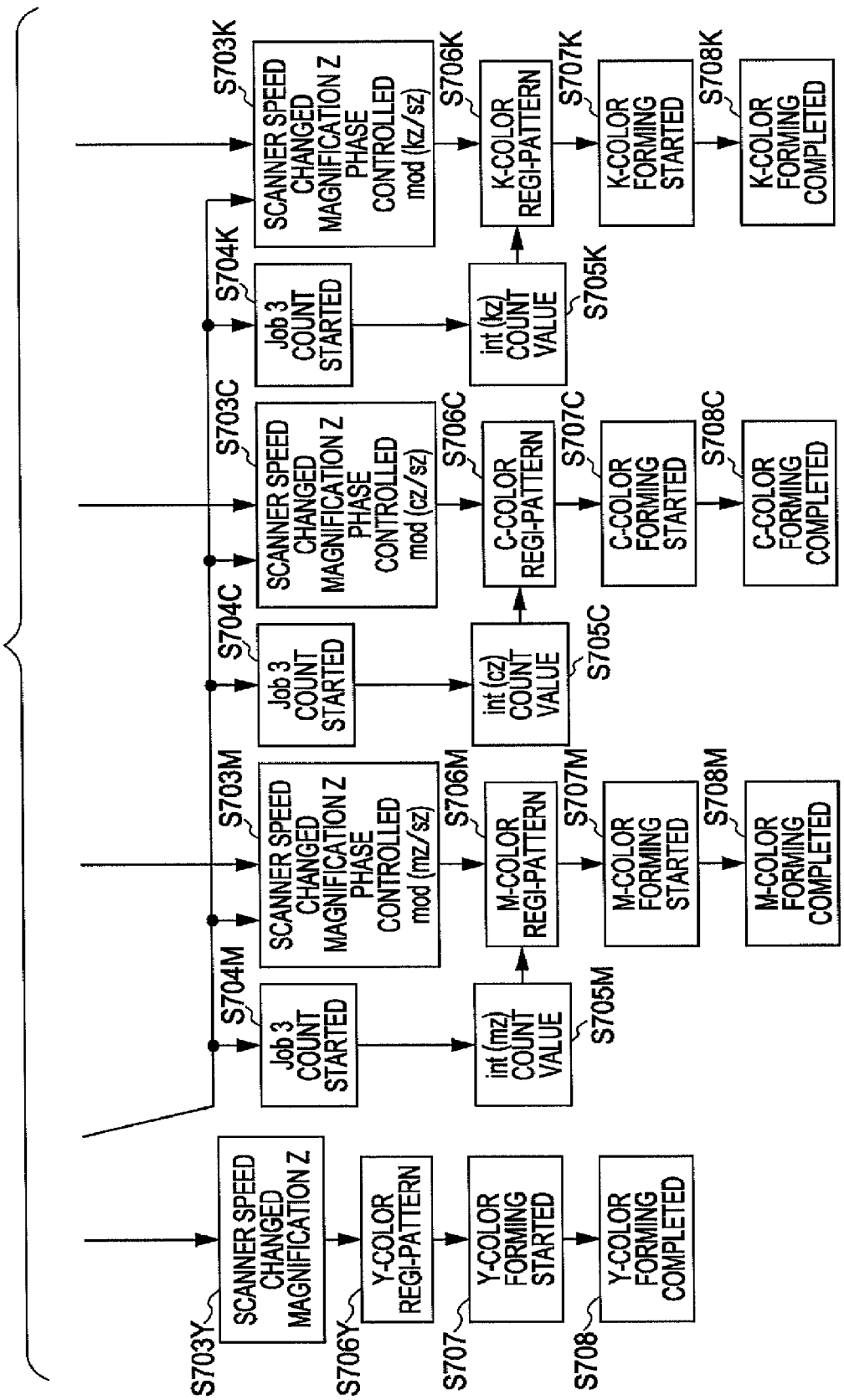

FIG. 18 is a flowchart showing the relationship between the reading of the printed registration pattern and the calculation for obtaining the correction, in which with suffixes Y, M, C, and K, the juxtaposed operations for each color are indicated.

Upon starting Job 1 of continuous page printing including image forming with different magnifications at Step S501, the job of first-page images with the magnification x is spooled. Then, the counting of leading edges of four-color images is timely started simultaneously. Since each of four-color operations is independent, the flow of the image-forming section of M-color (magenta) will be described as a representative.

In M-color, the counting of a horizontal synchronous signal is started at S504M. Then, after the completion of the previous page at S502M, the speed change and the phase control of the optical unit are executed with the magnification x at S503M.

After the speed and phase of the optical unit are stabilized, the registration pattern starts being printed at S506M on the basis of the counter value at S505M. Soon after that, M-color page images are formed with the magnification x and predetermined phase at S507M and completed at S508M.

Reference character mx in the drawing denotes an M-color correction with the magnification x obtained by a color-misalignment correction calculation unit; character int (mx) a count value of the edge line; character mod (mx/sx) a correction of one line and below; and character sx corresponds to a frequency of the horizontal synchronous signal with the magnification x. This control is repeated with the magnification of each image forming.

Other than the representative secondary-scanning position off-set 3013, which is the retardation between photosensitive drums, the correction includes the secondary scanning magnification correction, the primary scanning magnification correction, the scanning diagonal line displacement, and the correction of the primary-scanning position off-set 3023, which are calculated according to the magnification when the registration pattern is printed so as to operate by being converted into the correction with the reference magnification. These parameters are the same as the secondary-scanning position off-set 3013 in concept, so that the detailed description is omitted.

Second Embodiment

According to the first embodiment, the feeding back to the reference magnification is performed by converting the m0, c0, and k0 into the transfer position intervals between image forming sections for Y-color. Alternatively, on the basis of the secondary scanning speed as a reference, the transfer position intervals may be converted as a predetermined time, and the expression in the same unit due to the deduction of the magnification components enables the reference magnification conversion.

Third Embodiment

According to the first embodiment of the present invention, the initial state is expressed by the initial values m0, c0, and k0 when the number of color-misalignment correction detection times is zero; alternatively, in an apparatus having a basic correction sequence used at the turning on the power other than the continuous page printing, the basic correction sequence state at that time may be the initial state. The color-misalignment detection result according to the present invention may also be used as additional correcting means for the basic correction sequence. The combined use of a color-misalignment detection result obtained by means other than the means according to the present invention does not limit the applications of the present invention.

Fourth Embodiment

According to the first embodiment of the present invention, the color-misalignment correction calculation unit in the apparatus according to the embodiment has the present correction by averaging detected results of the last but one and the last color misalignments with the reference magnification; however, the correction calculation using two or more correction results at past times, such as the last but two, and general statistic correcting means other the averaging may also incorporate the present invention.

Other Embodiments

According to the embodiments described above, images are formed on front and rear sides of a sheet by changing the magnification of the images with a magnification rate corresponding to the expansion/retraction of the sheet during the image forming; the present invention is not limited to this, so that by forecasting the expansion/retraction of the sheet, the variable power may also be processed on the front side images. For example, the front side images may be formed by enlarging them so that the image size is returned to the original one due to the sheet shrinkage due to the heat fixing. When the rear side images are formed at the same size, the front side images can agree with the rear side images in size. The variable power may be obviously processed on the respective images on the front and rear sides.

The embodiment shown in FIG. 1 has a so-called four-tandem type structure using the intermediate transfer belt 30; the present invention is not limited to this, so that without using the intermediate transfer belt 30, images of a manuscript may be directly formed on a sheet (in this case, the images are adjusted by forming an image adjusting patch directly on a conveying belt for conveying the sheet, in which the conveying belt becomes a carrier and the images are adjusted in the same way as in the embodiments); and with a structure called a four-cycle type forming full-color images by recording images four times a cycle, the images on front and rear sides can be precisely aligned by changing the magnification of the images on the front or rear side with a magnification rate corresponding to the expansion/retraction of the sheet. The present invention is not of course limited to the four-color apparatus, so that three-color or less or five-color or more may also incorporate the invention. It is not limited to the color image forming apparatus and a monochrome image forming apparatus may be applied to the invention. Also, colors of recording materials for use are not limited to the example described above.

The present invention may be incorporated not only to the color image forming apparatus but also to the monochrome image forming apparatus. According to an embodiment of the present invention in that black toner images of the registration pattern are formed on an image carrier, such as a photosensitive drum, an outside transfer roller, and a test print sheet; and a patch sensor is arranged for reading the toner images, so that the image forming position on the recording medium is corrected; while the high-accuracy image forming position control being achieved on the basis of the patch sensor as a reference and the image forming by adjusting the magnification rate for each kind of the sheet and each of the sheet sides, the productivity of the continuous printing can be maintained to be high.

The embodiment shown in FIG. 1 employs electrophotography for image forming using the optical unit; however, the present invention is not limited to this, so that it may be applied to various known methods for forming images. For example, with a galvanometer mirror system for reciprocating scanning instead of the polygon mirror, the sheet having images formed thereon may also be elongated. In this case, by enlarging images on the rear side corresponding to a magnification rate or by shrinking images on the front side corresponding to the magnification rate, the images on both sides can also be precisely aligned in size.

In the image forming apparatus, the fixing temperature in the fixing unit 40 may be generally set at any one of a plurality of stages. Even at the same fixing temperature, the thermal contraction rate is different due to the sheet thickness. FIG. 19 shows magnification rate examples established corresponding to the sheet thickness and the fixing temperature, in which magnification rates in the upper section denote the magnification rate in the principal scanning direction and those in the lower section denote the magnification rates in the secondary scanning direction. In such a manner, the respective magnification rates may be set in the principal and secondary scanning directions. Furthermore, depending upon kinds of the sheet, an example is shown in that the magnification rates are established in accordance with the sheet thickness and the fixing temperature. Obviously, the numeric values of the magnification rate, the sheet thickness, and the fixing temperature are examples, so that they may be arbitrarily established.

Among them, the fixing temperature may be frequently determined by the apparatus and the operation mode, whereas the kind and thickness of the sheet depend on a user's selection. Hence, the setting of these items may be by a user's selection as shown in FIGS. 6A to 6C, and alternatively, a sensor is provided for automatically selecting the items by the measurement of the sensor. Furthermore, the dimensions of the sheet before and after the expansion/contraction may be measured in practice. Also, in an apparatus selectable an ICC (international color consortium) profile, the setting of these items is written in the ICC profile, so that the magnification rate may be automatically established by the selection of the ICC profile. When the information inputted to the image forming apparatus includes a TIFF (tag image file format) file, the setting of these items may also be written in this file. Other than the kind and thickness of the sheet and the fixing temperature, in view of the effect of various factors, such as the ambient humidity and temperature, the magnification rate may be determined by forecasting the expansion/contraction of the sheet.

As described above, according to the image forming apparatus of the present invention, in the image forming on a plurality of continuous pages, when the rotation speed change of the polygon motor is performed first, such that the forming of the registration patch or the image adjusting patch are performed on the same space between pages, the trailing end white space of the sheet and a predetermined space for the patch can be eliminated, so that the distance between pages is reduced, preventing the productivity deterioration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-347970 filed Dec. 01, 2005, and No. 2006-287446 filed Oct. 23, 2006, which are hereby incorporated by reference herein in their entirety.

What is claimed is:

1. An image forming apparatus comprising:
   a beam generator for generating a beam;
   a scanning unit for recording images on a photosensitive member by scanning the images with the beam generated from the beam generator;
   a speed control unit for changing the magnification of the images to be recorded on the photosensitive member by controlling the scanning speed of the scanning unit;
   a carrier on which the images formed on the photosensitive member are transferred to a recording medium, and a conveying member for conveying the recording medium;
   a pattern control unit for forming pattern images for correcting target images at a second scanning speed on a region between a first region on the carrier, on which the images recorded at a first scanning speed are formed, and a second region, on which the images recorded at the second scanning speed different from the first scanning speed are formed;
   a detection unit for detecting the displacement in image forming position by reading the formed pattern images; and
   a correction unit for correcting the image forming position of the target images on the basis of the detected displacement at the second scanning speed.

2. The apparatus according to claim 1, wherein the pattern control unit forms the pattern on a region, on which the pattern images are formed, at the second scanning speed after the speed is changed from the first scanning speed to the second scanning speed by the speed control unit.

3. The apparatus according to claim 1, wherein the pattern control unit forms the pattern on a region, on which the pattern images are formed, at the second scanning speed prior to the changing the speed from the second scanning speed to the first scanning speed by the speed control unit.

* * * * *